(12) United States Patent
Kim et al.

(10) Patent No.: US 11,302,904 B2
(45) Date of Patent: Apr. 12, 2022

(54) ELECTRODE COMPOSITE CONDUCTING AGENT FOR LITHIUM BATTERY, ELECTRODE FOR LITHIUM BATTERY, METHOD OF MANUFACTURING THE SAME, AND LITHIUM BATTERY INCLUDING THE ELECTRODE

(71) Applicants: Samsung Electronics Co., Ltd., Suwon-si (KR); Samsung SDI Co., Ltd., Yongin-si (KR)

(72) Inventors: Mijong Kim, Suwon-si (KR); Inhyuk Son, Yongin-si (KR); Sangkook Mah, Seoul (KR); Jumyeung Lee, Suwon-si (KR); Minwoo Lim, Suwon-si (KR); Junghyun Choi, Yongin-si (KR); Sungsoo Han, Hwaseong-si (KR)

(73) Assignees: SAMSUNG ELECTRONICS CO., LTD., Suwon-si (KR); SAMSUNG SDI CO., LTD., Gyeonggi-Do (KR)

( * ) Notice: Subject to any disclaimer, the term of this patent is extended or adjusted under 35 U.S.C. 154(b) by 113 days.

(21) Appl. No.: 16/557,097

(22) Filed: Aug. 30, 2019

(65) Prior Publication Data

US 2020/0161634 A1    May 21, 2020

(30) Foreign Application Priority Data

Nov. 19, 2018    (KR) .......................... 10-2018-0142512

(51) Int. Cl.
*H01M 4/133* (2010.01)
*H01M 4/62* (2006.01)
(Continued)

(52) U.S. Cl.
CPC .......... *H01M 4/133* (2013.01); *H01M 4/134* (2013.01); *H01M 4/1393* (2013.01);
(Continued)

(58) Field of Classification Search
None
See application file for complete search history.

(56) References Cited

U.S. PATENT DOCUMENTS

| | | |
|---|---|---|
| 2011/0189540 A1 | 8/2011 | Mori et al. |
| 2012/0034522 A1 | 2/2012 | Sheem et al. |

(Continued)

FOREIGN PATENT DOCUMENTS

| | | |
|---|---|---|
| EP | 2854204 A1 | 4/2015 |
| JP | 201330462 A | 2/2013 |

(Continued)

*Primary Examiner* — Eugenia Wang
(74) *Attorney, Agent, or Firm* — Cantor Colburn LLP

(57) ABSTRACT

An electrode composite conducting agent for a lithium battery includes a carbonaceous conductive material, and the graphene-silica composite, wherein the graphene-silica composite includes a matrix including graphene, and a silicon suboxide of the formula $SiO_x$ wherein $0<x<2$, or a combination of silicon dioxide and silicon suboxide of the formula $SiO_x$ wherein $0<x<2$, or a combination thereof, wherein an amount of the graphene-silica composite is 20 parts by weight or less, based on 100 parts by weight of a total weight of the composite conducting agent. Also an electrode for a lithium battery including the electrode composite conducting agent, a method of manufacturing the electrode, and a lithium battery including the electrode.

20 Claims, 17 Drawing Sheets

(51) Int. Cl.

| | | |
|---|---|---|
| *H01M 4/1393* | (2010.01) | |
| *H01M 10/0525* | (2010.01) | |
| *H01M 4/36* | (2006.01) | |
| *H01M 4/1395* | (2010.01) | |
| *H01M 4/48* | (2010.01) | |
| *H01M 4/587* | (2010.01) | |
| *H01M 4/38* | (2006.01) | |
| *H01M 4/134* | (2010.01) | |

(52) U.S. Cl.
CPC ......... *H01M 4/1395* (2013.01); *H01M 4/364* (2013.01); *H01M 4/366* (2013.01); *H01M 4/386* (2013.01); *H01M 4/48* (2013.01); *H01M 4/587* (2013.01); *H01M 4/621* (2013.01); *H01M 4/624* (2013.01); *H01M 4/625* (2013.01); *H01M 10/0525* (2013.01)

(56) References Cited

U.S. PATENT DOCUMENTS

| | | |
|---|---|---|
| 2012/0308894 A1 | 12/2012 | Oguni et al. |
| 2015/0093648 A1 | 4/2015 | Son et al. |
| 2015/0263337 A1 | 9/2015 | Naoi et al. |
| 2015/0380728 A1 | 12/2015 | Son et al. |
| 2017/0263921 A1 | 9/2017 | Choi et al. |
| 2018/0083272 A1 | 3/2018 | Son et al. |
| 2019/0207221 A1 | 7/2019 | Son et al. |

FOREIGN PATENT DOCUMENTS

| | | |
|---|---|---|
| KR | 1020100006396 A | 1/2010 |
| KR | 1020110019361 A | 2/2011 |
| KR | 101181851 B1 | 9/2012 |
| KR | 1020130033733 A | 4/2013 |
| KR | 1020130040541 A | 4/2013 |
| KR | 1020150052844 A | 5/2015 |
| KR | 1020150141473 A | 12/2015 |
| KR | 1020170063271 A | 6/2017 |
| KR | 1020170105873 A | 9/2017 |
| KR | 1020180031585 A | 3/2018 |
| KR | 1020190083613 A | 7/2019 |

ELECTRODE COMPOSITE CONDUCTING AGENT FOR LITHIUM BATTERY, ELECTRODE FOR LITHIUM BATTERY, METHOD OF MANUFACTURING THE SAME, AND LITHIUM BATTERY INCLUDING THE ELECTRODE

CROSS-REFERENCE TO RELATED APPLICATION

This application claims priority to and the benefit of Korean Patent Application No. 10-2018-0142512, filed on Nov. 19, 2018, in the Korean Intellectual Property Office, the content of which is incorporated herein in its entirety by reference.

BACKGROUND

1. Field

The present disclosure relates to an electrode composite conducting agent for a lithium battery, an electrode for a lithium battery and including the electrode composite conducting agent, a method of preparing the electrode, and a lithium battery including the electrode.

2. Description of the Related Art

Lithium ion batteries (LIBs) have been used as power sources for various portable devices due to their high energy density and ease of design. With recent growing trends of using LIBs as power sources of electric vehicles/power storage rather than portable information technology (IT) devices, extensive research has been conducted on materials capable of providing high energy density and a long lifespan.

Currently, commercially available electric vehicles have low travel distances and slow charging times, and therefore have technical limitations in replacing existing petroleum-based energy sources. Thus there is an urgent need to develop battery materials to provide improved capacity and charging characteristics.

SUMMARY

Provided is an electrode composite conducting agent for a lithium battery.

Provided is an electrode for a lithium battery, the electrode including the electrode composite conducting agent, and methods of preparing the same.

Provided is a lithium battery including the electrode and having improved output characteristics.

Additional aspects will be set forth in part in the description which follows and, in part, will be apparent from the description, or may be learned by practice of the presented embodiments.

According to an aspect of an embodiment, an electrode composite conducting agent for a lithium battery includes: a carbonaceous conductive material; and a graphene-silica composite, wherein the graphene-silica composite includes a matrix comprising graphene, and a silicon suboxide of the formula $SiO_x$ wherein $0<x<2$, or a combination of silicon dioxide and silicon suboxide of the formula $SiO_x$ wherein $0<x<2$, wherein an amount of the graphene-silica composite is 20 parts by weight or less, based on 100 parts by weight of a total weight of the composite conducting agent.

According to an aspect of another embodiment, an electrode for a lithium battery includes the electrode composite conducting agent.

According to an aspect of another embodiment, a method of preparing an electrode for a lithium battery includes: dry mixing an electrode active material, a carbonaceous conductive material, and a graphene-silica composite to obtain a mixture; adding a binder and a solvent to the dry-mixed mixture; and mixing the binder and the mixture to obtain an electrode active material composition, wherein the graphene-silica composite includes a matrix comprising graphene, and a silicon suboxide of the formula $SiO_x$ wherein $0<x<2$, or a combination of silicon dioxide and silicon suboxide of the formula $SiO_x$ wherein $0<x<2$, wherein an amount of the graphene-silica composite is 20 parts by weight or less, based on 100 parts by weight of a total weight of the carbonaceous conductive material and the graphene-silica composite constituting a composite conducting agent.

According to an aspect of another embodiment, a lithium battery includes the electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
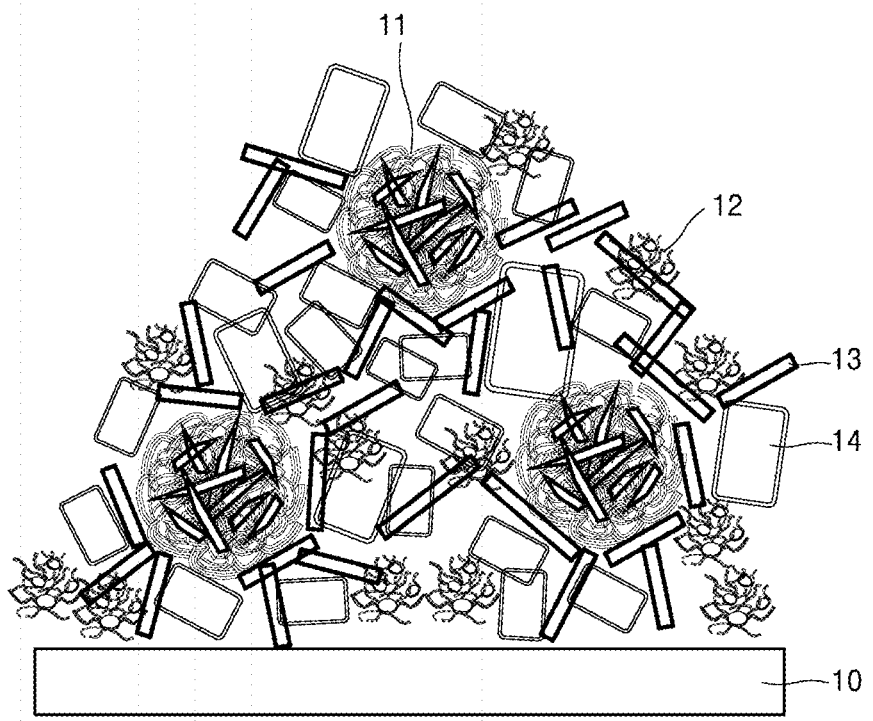
FIG. 1 is a schematic view illustrating an embodiment of an electrode for a lithium battery.

The invention now will be described more fully hereinafter with reference to the accompanying drawings, wherein like reference numerals refer to like elements throughout. In this regard, the present embodiments may have different forms and should not be construed as being limited to the descriptions set forth herein. Accordingly, the disclosed embodiment is merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term "graphene" as used in the present specification means a polycyclic aromatic molecule formed from a plurality of carbon atoms which are covalently bound to each other. The covalently bound carbon atoms may form a six-membered ring as a repeating unit, and may further include at least one of a five-membered ring and a seven-membered ring. Accordingly, graphene comprises a single layer of covalently bonded carbon atoms having sp2 hybridization. For convenience, "graphene" as used herein may be a single layer, or also may comprise a plurality of layers of carbon, e.g., 1 to 100 layers, or 1 to 30 layers of carbon. Thus graphene, as used herein, may have a multiply layered structure formed by stacking single layers of graphene.

Hereinafter, an electrode composite conducting agent for a lithium battery, an electrode including the same, a method of preparing the electrode, and a lithium battery including the electrode according to embodiments will be described in further detail with reference to the accompanying drawings.

An electrode composite conducting agent for a lithium battery comprises: a carbonaceous conductive material; and a graphene-silica composite, wherein the graphene-silica composite comprises a matrix comprising graphene, and a silicon suboxide of the formula $SiO_x$ wherein $0<x<2$, or a combination of silicon dioxide ($SiO2$) and silicon suboxide of the formula $SiO_x$ wherein $0<x<2$, or a combination thereof, wherein an amount of the graphene-silica composite is 20 parts by weight or less, based on 100 parts by weight of a total weight of the composite conducting agent. The silica, i.e., silicon suboxide of the formula $SiO_x$ wherein $0<x<2$, silicon dioxide ($SiO_2$), or a combination thereof, may be positioned on the graphene matrix, or may be within the graphene matrix. The term "silica" as used in the present specification refers to silicon suboxide of the formula $SiO_x$ wherein $0<x<2$, silicon dioxide, or combination thereof.

Where a negative electrode comprises carbonaceous conductive agent, such as graphite, simultaneously with a porous silicon composite, and a graphite-based material as the negative active material, and while not wanting to be bound by theory, it is understood that voids are formed in the negative electrode because the porous silicon composite and the graphite-based material have sizes of several tens of micrometers. Thus, the mobility of lithium ions may be lowered and an ability to buffer volume changes, e.g., those caused by cycling of lithium ions, may deteriorate. In addition, because the carbonaceous conductive agent is positioned around the negative active material, migration of lithium ions toward an active material may be reduced, and it may be difficult to maintain conductivity during charge and discharge cycles due to a large number of voids formed between particles. In addition, because graphite, as the carbonaceous conductive material, has a size of several micrometers to several tens of micrometers, and has a flake shape, it is difficult to uniformly disperse graphite in an electrode in which electrode active materials are stacked.

In order to solve these problems, the present inventors have suggested an electrode composite conducting agent for a lithium battery including a carbonaceous conductive material and a graphene-silica composite wherein an amount of the graphene-silica composite is selected to be about 20 parts by weight or less, for example, in the range of about 0.5 parts by weight to about 20 parts by weight, for example, about 5 parts by weight to about 20 parts by weight, for example, about 5 parts by weight to about 10 parts by weight, based on 100 parts by weight of the composite conducting agent. The 100 parts by weight of the composite conducting agent represents 100 parts by weight of a total weight of the carbonaceous conductive material and the graphene-silica composite.

The graphene-silica composite of the composite conducting agent, having improved carbon crystallinity and a size of several tens of nanometers, e.g., about 10 to about 1000 nanometers, or about 30 nanometers to about 500 nanometers, may fill voids of the electrode. Therefore, in comparison to when a different carbonaceous conductive material is used as a conductive agent, adhesion between the components in the electrode is improved, thereby strengthening a three-dimensional conductive network. As a result, an electrode expansion rate decreases and a surface-to-surface conductive path may be improved and maintained. By using the composite conducting agent including the graphene-silica composite according to an embodiment, voids may be reduced in the electrode, thereby preventing the conductive path from being disconnected or short-circuited, and preventing lithium ion mobility to the active material from being lowered.

When the composite conducting agent according to an embodiment is used, an expansion rate of an electrode, and a battery comprising the composite conducting agent, are reduced and binding force between a current collector and an electrode active material is increased, thereby preventing separation of the electrode active material from the current collector, even after repeated charging and discharging processes. In addition, an electrical short circuit is prevented during the charge and discharge cycles. As a result, by using an electrode including the electrode composite conducting agent, a lithium battery having improved electrolyte impregnating properties, improved initial efficiency, and improved lifespan and charging and discharging rate characteristics may be manufactured.

For example, the carbonaceous conductive material may comprise graphene, graphite, carbon black, carbon nanotube, vapor grown carbon fiber (VGCFs), metal-clad carbon fiber, or a combination thereof. The carbonaceous conductive material may have a specific surface area of about 10 square meters per gram ($m^2/g$) to about 1,000 $m^2/g$, for example, about 11 $m^2/g$ to about 500 $m^2/g$, for example, about 12 $m^2/g$ to about 300 $m^2/g$, for example about 15 $m^2/g$ to about 100 $m^2/g$.

The graphene-silica composite may have a specific surface area of about 50 $m^2/g$ to about 800 $m^2/g$, for example, about 50 $m^2/g$ to about 500 $m^2/g$, for example, about 50 $m^2/g$ to about 300 $m^2/g$, for example, about 100 $m^2/g$ to about 200 $m^2/g$.

The amount of the graphene-silica composite is selected to be about 20 parts by weight or less, for example, about 0.5 parts by weight to about 20 parts by weight, for example, about 5 parts by weight to about 20 parts by weight, for example, about 5 parts by weight to about 10 parts by weight based on 100 parts by weight of the composite conducting agent. When the amount of the graphene-silica composite is within the ranges above, adhesiveness between structures in the electrode may be improved and the voids are reduced.

The electrode active material may be any suitable electrode active material for a lithium battery. For example, a porous silicon composite, or a combination of a porous silicon composite and a carbonaceous negative active material may be used. The porous silicon composite and the carbonaceous negative active material may constitute a carbonaceous composite. The porous silicon composite is a silicon-containing composite.

The carbonaceous negative active material may comprise natural graphite, artificial graphite, expanded graphite, graphene, carbon black, fullerene soot, carbon nanotube, graphitic carbon, carbon fiber, or a combination thereof. However, the carbonaceous negative active material is not limited thereto, and any suitable material available in the art may also be used.

The carbonaceous conductive material may have a flake shape, a plate shape, a rod shape, an irregular shape, or a combination thereof.

The carbonaceous conductive material may be about 1 nm to about 99 μm. The size of the carbonaceous conductive material may be from about 1 μm to about 99 μm, for example, from about 1 μm to about 50 μm, for example, from about 1 μm to about 10 μm, for example, from about 1 μm to about 5 μm. When a carbonaceous conductive material is used, a void may be present between structures in the electrode, and while not wanting to be bound by theory, it is understood that the void may cause deterioration in charging and discharging characteristics, such as, lifespan characteristics and high rate characteristics, and an increase in an electrode expansion ratio. Throughout the specification, the size of the carbonaceous conductive material indicates an average particle diameter in the case where the carbonaceous conductive material is spherical, and indicates a length of a major axis in the case where the carbonaceous conductive material is not spherical.

FIG. 1 is a schematic view illustrating a structure of an electrode for a lithium battery including an electrode composite conducting agent according to an embodiment. The electrode may be, for example, a negative electrode.

As illustrated in FIG. 1, the electrode has a structure in which an electrode active material layer, which comprises a first electrode active material 11, a second electrode active material 14, and composite conducting agent comprising a carbonaceous conductive material 13, and a graphene-silica composite 12, are disposed on a current collector 10.

For example, each of the first electrode active material 11 and the second electrode active material 14 may include a carbonaceous material, a silicon-based material, a silicon oxide, a silicon-based alloy, a silicon-carbonaceous material composite, tin, a tin-based alloy, a tin-carbon composite, a metal oxide, a porous silicon composite, or a combination thereof. A combination comprising at least one of the foregoing may be used. According to an embodiment, the first electrode active material 11 may be, for example, a porous silicon composite illustrated in FIG. 2B. The graphite may be a natural graphite or an artificial graphite. In addition, since the graphene-silica composite 12 is uniformly dispersed around the first electrode active material 11, the second electrode active material 14, and the carbonaceous conductive material 13, and in the void as shown in FIG. 1, the voids may be reduced in the electrode and a surface-to-surface conductive path may be formed. Although FIG. 1 illustrates two types of electrode active materials, it is also possible to use a single type.

Figure 2A:
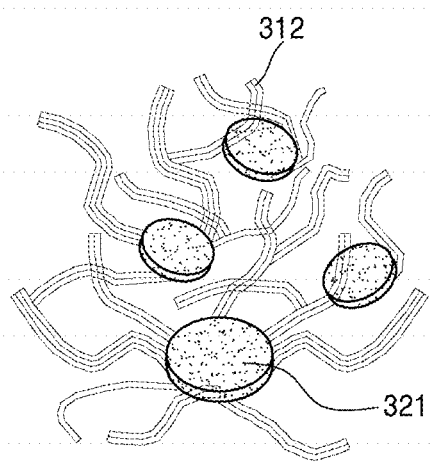
FIG. 2A is a schematic view illustrating a structure of an embodiment of a graphene-silica composite.

The graphene-silica composite includes silica 321 and graphene 312 as illustrated in FIG. 2A. The silica 321 may be silicon suboxide of the formula $SiO_x$ wherein $0<x<2$; or a combination of the silicon suboxide and silicon dioxide ($SiO_2$).

As used herein, the term "silicon suboxide" is a composition represented by the formula $SiO_x$ (wherein $0<x<2$). Alternatively, the silicon suboxide may be, for example, a combination comprising Si and $SiO_2$ having an average composition represented by $SiO_x$ (wherein $0<x<2$).

The silicon suboxide may be present in a state of a film, a matrix, or a combination thereof.

According to an embodiment, the graphene-silica composite may be in the form of particles including the silicon suboxide ($SiO_x$, $0<x<2$) and graphene, particles in which silicon suboxide ($SiO_x$, $0<x<2$) is completely surrounded by graphene, or a combination thereof. The particles including the silicon suboxide ($SiO_x$, $0<x<2$) and the graphene, particles in which silicon suboxide ($SiO_x$, $0<x<2$) is completely surrounded by graphene, or a combination thereof may be interconnected with each other in matrix comprising graphene, e.g., a graphene matrix.

According to an embodiment, the graphene in the particles comprising silicon suboxide and graphene, the particles in which silicon suboxide is completely surrounded by graphene, or a combination thereof are interconnected to form the matrix comprising graphene.

According to another embodiment, the graphene-silica composite may be in the form of particles in which silicon dioxide ($SiO_2$) is partially or completely surrounded by silicon suboxide ($SiO_x$, $0<x<2$).

The graphene-silica composite may also be referred to as graphene ball or a graphene sphere.

The graphene-silica composite may have any suitable shape that may present in the voids inside the electrode. The graphene-silica composite may have a crumpled structure. The crumpled structure according to an embodiment may be, for example, a crumpled-sphere structure. The structure may vary according to a shape of silicon dioxide ($SiO_2$) that is a starting material for forming the graphene-silica composite. For example, when the silicon dioxide ($SiO_2$) is in the form of spherical particles, the graphene-silica composite may have a crumpled-sphere structure, e.g., a crumpled-ball structure. As another example, when silicon dioxide ($SiO_2$) is mesoporous silicon dioxide, the graphene-silica composite may have a rectangular structure.

The graphene-silica composite according to an embodiment may have a crumpled-sphere structure. The graphene-silica composite according to an embodiment may have a crumpled-spherical paper ball structure. Reduction products of the silicon dioxide ($SiO_2$), e.g., silicon suboxide ($SiO_x$, $0<x<2$); or silicon suboxide ($SiO_x$, $0<x<2$) and silicon dioxide ($SiO_2$), may be distributed in the structure.

In the graphene-silica composite, silica may be in the form of a particle, tube, rod, nanowire, nanoribbon, fiber, lump, or a combination thereof.

For example, the graphene-silica composite may have a popcorn-like graphene ball structure, e.g., having an appearance of merged spheres to provide a merged-sphere structure, a faceted-sphere structure, or a crumpled-sphere structure, or a combination thereof. The graphene-silica composite may have a popcorn-like graphene ball structure, e.g., a merged-sphere structure, as illustrated in FIG. 2A.

An amount of graphene contained in the graphene-silica composite may be in the range of about 0.001 parts by weight to about 90 parts by weight, for example, about 10 parts by weight to about 80 parts by weight, based on 100 parts by weight of the total weight of the composite. When the amount of graphene is within the ranges above, conductivity of the graphene-silica composite is considerably improved. For example, a size of the graphene-silica composite may be from about 10 nm to about 300 nm, for example, about 50 nm to about 200 nm. The size of the graphene-silica composite indicates an average particle diameter in the case where the graphene-silica composite is spherical, and indicates a length of a major axis in the case where the graphene-silica composite is not spherical.

In the graphene-silica composite, the graphene may extend from the silica by a distance of 10 nm or less, for example, 5 nm or less, for example, 3 nm or less, for example, 1 nm or less, for example, in the range of about 0.0001 nm to about 1 nm, about 0.001 nm to about 0.1 nm, or about 0.01 nm. The graphene-silica composite may comprise about 1 to about 20 graphene layers, for example, about 1 to about 10 graphene layers, and a total thickness of the graphene layers may be from about 0.6 nm to about 12 nm, or about 1 nm to about 10 nm.

The degree of adhesion between silica and graphene may be evaluated by measuring a distance between silica and graphene using a scanning electron microscope. The graphene may extend from the silica by a distance of 10 nm or less, for example, a distance of 1 nm or less. The graphene may be oriented at an angle of 0 to 90° with respect to a major axis of the silica, e.g., silicon suboxide of the formula $SiO_x$ wherein $0<x<2$, silicon dioxide ($SiO_2$), or a combination thereof. In this regard, the major axis may refers to a Y axis. The graphene-silica composite may comprise at least 1 to about 20 graphene layers, and the total thickness of the graphene layers may be from about 0.6 nm to about 12 nm. The graphene may be oriented at an angle of 0 to 90° with respect to the major axis of the silica.

The graphene-silica composite according to an embodiment may be manufactured according to the following method.

A reaction gas including a carbon source gas is supplied to a structure including silicon dioxide ($SiO_2$) and the structure is heat-treated.

The carbon source gas may comprise a compound represented by Formulae 2 below, or may be a mixed gas including a compound represented by Formula 2 below, and a compound represented by Formula 1, an oxygen-containing gas represented by Formula 3, or a combination thereof.

$$C_nH_{(2n+2-a)}[OH]_a \quad \text{Formula 1}$$

In Formula 1, n is from 1 to 20 and a is 0 or 1.

$$C_nH_{(2n)} \quad \text{Formula 2}$$

In Formula 2, n is 2 to 6.

$$C_xH_yO_z \quad \text{Formula 3}$$

In Formula 3, x is 0 or an integer of 1 to 20, y is 0 or an integer of 1 to 20, and z is 1 or 2. Also, in Formulas 1 and 2, n is independently selected.

For example, the carbon source gas may comprise methane, ethylene, propylene, methanol, ethanol, propanol, acetylene, or a combination thereof, and for example, may be methane. The oxygen-containing gas may be, for example, carbon dioxide ($CO_2$), carbon monoxide (CO), water vapor ($H_2O$), or a combination thereof.

After supplying the reaction gas of the carbon source gas to the silicon dioxide ($SiO_2$) and heat-treating the mixture, the resultant may further be subjected to a cooling process using at least one inert gas, e.g., nitrogen, helium, argon, or a combination thereof. In this regard, the cooling process refers to a process where the temperature is returned to room temperature, i.e., in the range of 20° C. to 25° C.

The carbon source gas may also comprise an inert gas, e.g., nitrogen, helium, argon, or a combination thereof. The heat treatment may be performed at a temperature of about 700° C. to about 1100° C.

In addition, because graphene is coated on the silicon suboxide ($SiO_x$, $0<x<2$) as a reduction product of silicon dioxide ($SiO_2$), or a combination of silicon suboxide ($SiO_x$, $0<x<2$) and silicon dioxide ($SiO_2$) by vapor phase reaction, a coating film having high crystallinity may be formed. When such a graphene-silica composite is used as a conductive agent, conductivity of an electrode active material may be increased without a structural change.

Throughout the specification, the porous silicon composite includes a porous core having a porous silicon secondary particle and a shell formed on at least one surface of the porous core and including a first graphene. In this regard, the porous silicon secondary particle may comprise a plurality of silicon composite primary particles, and a silicon composite primary particles of the plurality of silicon composite primary particles may comprise silicon, silicon suboxide ($SiO_x$, $0<x<2$) on the silicon, and a second graphene disposed on at least one surface of the silicon suboxide ($SiO_x$, $0<x<2$).

The porous silicon composite and a manufacturing method thereof are disclosed in Korean Patent Laid-open Publication No. 10-2018-0031585, the content of which is incorporated herein by reference in its entirety.

According to another embodiment, an electrode for a lithium battery including the above-described electrode composite conducting agent is provided.

For example, the electrode may be a negative electrode.

The negative electrode may include any suitable negative active material used in lithium batteries, for example, a carbonaceous material, a silicon-based material, a silicon oxide, a silicon-based alloy, a silicon-carbonaceous material composite, tin, a tin-based alloy, a tin-carbon composite, a metal oxide, a porous silicon composite, or a combination thereof.

For example, the negative active material may comprise a porous silicon composite and a carbonaceous material.

When the porous silicon composite is used as the negative active material, volume expansion of the negative electrode is suppressed and conductivity may be improved, thereby improving rate characteristics. In this regard, an amount of the carbonaceous material may be from about 0.001 parts by weight to about 99.999 parts by weight, for example, from about 10 parts by weight to about 98 parts by weight, for example, from about 20 parts by weight to about 95 parts by weight, for example, from about 30 parts by weight to about 92 parts by weight, for example, from about 50 parts by weight to about 90 parts by weight based on 100 parts by weight, of the total weight of the porous silicon composite and the carbonaceous material. When the amount of the carbonaceous material is within the ranges above, a lithium battery having improved charging/discharging rate characteristics, and lifespan characteristics, with improved capacity retention may be provided.

For example, the carbonaceous material may comprise plate-like graphite, spherical graphite, non-uniform graphite, or a combination thereof. The carbonaceous material may compensate for instability of electrodes caused by high capacity in the case where the porous silicon composite is used alone, and capacity characteristics and charging and discharging rate characteristics may further be improved.

Hereinafter, a method of preparing an electrode for a lithium battery according to an embodiment will be further described.

First, an electrode active material, a carbonaceous conductive material, and a graphene-silica composite are dry mixed to obtain a mixture. The dry mixing is performed in a mixer such that the graphene-silica composite is uniformly dispersed, together with the electrode active material and the carbonaceous conductive material, in the mixture without aggregation. Without such a dry mixing process, the graphene-silica composite may aggregate, and thus mixing and dispersing of the graphene-silica composite with another component may not be satisfactory.

In the pre-dry mixing, for example, a Nobilta mixer or a Thinky mixer may be used as the mixer, and a rotation speed of the mixer may be in the range of about 100 rpm to about 800 rpm, for example, 300 rpm. A mixing time varies according to the rotation speed, or the like, and may be, for example, in the range of about 10 minutes to about 100 minutes.

When the electrode is a negative electrode, a negative active material is used as the electrode active material, and examples of the negative active material may include a carbonaceous material, silicon, a silicon oxide, a silicon-based alloy, a silicon-carbonaceous material composite, tin, a tin-based alloy, a tin-carbon composite, a metal oxide, or a combination thereof. For example, the negative active material may be a mixture of the porous silicon composite and the carbonaceous material.

Next, a binder and a solvent are added to and mixed with the dry mixed mixture to prepare an electrode active material composition. In addition, the amount of the graphene-silicon composite is selected to be about 20 parts by weight or less, based on 100 parts by weight of the total weight of the carbonaceous conductive material and the graphene-silica composite. In this regard, the total weight of the carbonaceous conductive material and the graphene-silica composite refers to a total weight of the composite conducting agent.

The amount of the composite conducting agent in the electrode may be, for example, from about 0.1 parts by weight to about 10 parts by weight, about 0.5 parts by weight to about 8 parts by weight, or about 1 parts by weight to about 5 parts by weight, based on 100 parts by weight of the total weight of the electrode.

The binder may be a binder suitable for the preparation of an electrode of a lithium battery. Examples of the binder include a vinylidene fluoride/hexafluoropropylene copolymer, polyvinylidene fluoride (PVDF), polyacrylonitrile, polymethylmethacrylate, polytetrafluoroethylene (PTFE), a styrene butadiene rubber polymer, polyacrylic acid, polyamideimide, polyimide, or a combination thereof.

The solvent may be N-methylpyrrolidone, acetone, water, or the like. However, the solvent is not limited thereto and may be any suitable solvent available in the art.

Figure 2B:
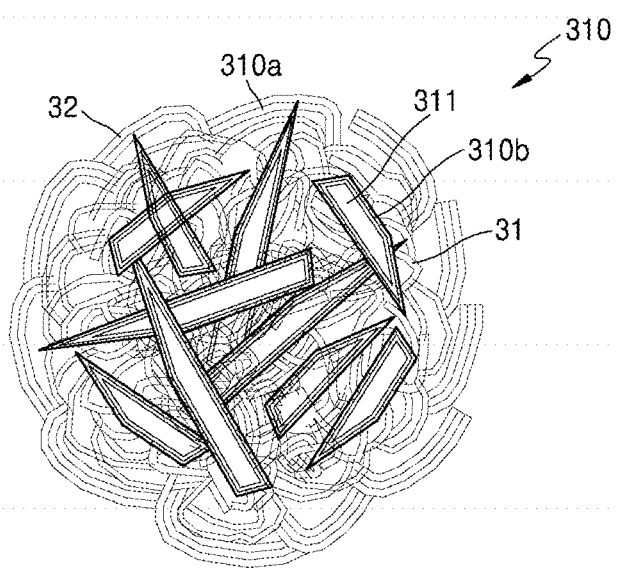
FIG. 2B is a schematic view illustrating a structure of an embodiment of a silicon-containing composite.

FIG. 2B illustrates a porous silicon composite according to an embodiment.

Referring to FIG. 2B, a porous silicon composite 310 includes a core 31 containing a porous silicon secondary particle and a shell 32 formed on the core 31 and including a first graphene 310a.

The porous silicon secondary particle includes an aggregate of a plurality of silicon composite primary particles, and a silicon composite primary particle of the plurality of silicon composite primary particles may comprise silicon 31 and a second graphene 310b disposed on the silicon 311. Because the second graphene 310b forms the shell on the surface of the silicon oxide of the silicon composite primary particle, and the first graphene 310a forms the shell 32 on the surface of the core 31 of the silicon composite secondary particle, the porous silicon composite 310 has a double core/shell structure. Such a double core/shell structure may prevent volume expansion and infiltration of an electrolytic solution, thereby reducing or preventing side reactions occurring between the electrolytic solution and the electrode active material.

Silicon suboxide ($SiO_x$, $0<x<2$) may further be disposed on the silicon 311. The second graphene 310b may be positioned on the silicon suboxide ($SiO_x$, $0<x<2$). Although the silicon 311 illustrated in FIG. 2B has a flake-like shape or an acicular shape, the silicon 311 may also have a spherical particle shape.

The second graphene 310b of the core 31 may have the same or different layers of the first graphene layers 310a of the shell 32. According to an embodiment, the first graphene 310a of the shell 32 may have a higher density than that of the second graphene 310b of the core 31. According to an embodiment, the second graphene 310b may have about 1 layer to about 30 layers, for example, about 5 layers to about 15 layers, particularly, about 10 layers in the core, and the first graphene 310a may have about 1 layer to about 50 layers, for example, about 20 layers to about 30 layers in the shell 32.

According to an embodiment, an outer layer having a higher density than that of the core 31 may be present. Although a thickness of the outer layer is not limited, the outer layer may have, for example, a thickness of about 20 nm to about 60 nm.

The core 31 and the shell 32 may further include graphite.

In the porous silicon composite, the core may have a diameter of about 3 μm to about 10 μm, and the shell may have a thickness of about 10 nm to about 5,000 nm (about 0.01 μm to about 5 μm), for example, about 10 nm to about 1,000 nm. A ratio of the diameter of the core of the porous silicon composite to the thickness of the shell (carbonaceous coating film) may be from about 1:0.001 to about 1:1.67, for example, 1:0.001, 1:1.67, 1:0.0033, or 1:0.5.

In the porous silicon composite, a total amount of the first graphene and the second graphene may be from about 0.1 parts by weight to about 2,000 parts by weight, for example, from about 0.1 parts by weight to about 300 parts by weight, for example, from about 0.1 parts by weight to about 90 parts by weight, particularly, from about 5 parts by weight to about 30 parts by weight, based on 100 parts by weight of the silicon. When the total amount of the first graphene and the second graphene is within the ranges above, improved effects of inhibiting volume expansion of silicon and improved conductivity may be obtained.

In the composite primary particles, the second graphene may extend from silicon suboxide ($SiO_x$, $0<x<2$) by a distance of about 10 nm or less, for example, about 1 nm or less, for example, from about 0.00001 nm to about 1 nm, includes at least one graphene layer, for example, about 1 to about 30 graphene layers, has a total thickness of about 0.3 nm to about 50 nm, for example, about 0.6 nm to about 50 nm, for example, about 1 nm to about 30 nm, and is oriented at an angle of 0 to 90° with respect to a major axis of silicon. In this regard, the major axis may be a Y axis.

In the porous silicon composite, the first graphene may extend from the silicon suboxide ($SiO_x$, $0<x<2$) by a distance of about 1,000 nm or less, for example, about 500 nm or less, for example, about 10 nm or less, for example, about 1 nm or less, for example, from about 0.00001 nm to about 1 nm, includes at least one graphene layer, for example, about 1 to about 30 graphene layers, has a total thickness of about 0.6 nm to about 50 nm, for example, about 1 nm to about 50 nm, and may be oriented at an angle of 0 to 90° with respect to the major axis of the silicon. The silicon suboxide ($SiO_x$, $0<x<2$) positioned on silicon may have a thickness of about 30 μm or less, for example, about 10 nm.

A porous silicon cluster may be regarded as a secondary particle.

An average particle diameter D50 of the porous silicon secondary particles may be from about 200 nm to about 50 μm, for example, from about 1 μm to about 30 μm, for example, from about 2 μm to about 25 μm, for example, from about 3 μm to about 20 μm, for example, from about 3 μm to about 10 μm, for example, from about 1 μm to about 15 μm, particularly, from about 7 μm to about 11 μm. A particle diameter D10 of the porous silicon secondary particles may be from about 0.001 μm to about 10 μm, for example, from about 0.005 μm to about 5 μm, for example, from about 0.01 μm to about 1 μm. In addition, a particle diameter D90 of the porous silicon secondary particles may be from about 10 μm to about 60 μm, for example, from about 12 μm to about 28 μm, for example, from about 14 μm to about 26 μm. In addition, the porous silicon secondary particles may have a specific surface area of about 0.1 m²/g to about 100 m²/g, for example, about 1 m²/g to about 30 m²/g, for example, about 1 m²/g to about 10 m²/g, for example, about 1 m²/g to about 5 m²/g. In addition, the porous silicon secondary particles may have a density of about 0.1 g/cc to about 2.8 g/cc, for example, about 0.1 g/cc to about 2.57 g/cc, for example, about 0.5 g/cc to 2 g/cc, for example, about 1.1 g/cc to about 1.2 g/cc, for example, about 1.18 g/cc.

The surface of the porous silicon composite may further include a carbonaceous coating film. Although initial efficiency decreases by using the carbonaceous coating film, a lithium battery having improved lifespan characteristics may be prepared. The carbonaceous coating film includes amorphous carbon that facilitates migration of lithium. The carbonaceous coating film may cover the surface area of the porous silicon composite in whole or in part. A coverage ratio of the carbonaceous coating film may be from about 10% to about 99%, for example, from about 20% to about 95%, for example, from about 40% to about 90% based on the surface area of the porous silicon composite.

A ratio of the diameter of the porous silicon composite to the thickness of the carbonaceous coating film is from about 1:1 to about 1:50, for example, from about 1:1 to about 1:40.

The carbonaceous coating film may have a thickness of about 1 nm to about 5,000 nm, for example, about 10 nm to about 2,000 nm. The carbonaceous coating film includes a carbonaceous material.

In the carbonaceous coating film, the amorphous carbon may comprise pitch carbon, soft carbon, hard carbon, mesophase pitch carbonization product, sintered coke, carbon fiber, or a combination thereof. The carbonaceous coating film may be a non-porous continuous coating film and may have a thickness of about 1 nm to about 5000 nm.

The carbonaceous coating film may further include crystalline carbon. The crystalline carbon may buffer volume expansion of the porous silicon composite more efficiently. The crystalline carbon may comprise natural graphite, artificial graphite, graphene, fullerene, carbon nanotube, or a combination thereof.

The carbonaceous coating film may have a single-layered structure including amorphous carbon and crystalline carbon. The carbonaceous coating film may also have a double-layered structure including a first carbonaceous coating film having amorphous carbon and a second carbonaceous coating film having crystalline carbon.

Silicon constituting the porous silicon composite may have various shapes such as an acicular particle, spherical particle, nanowire, nanoribbon, rod, or combination thereof. The silicon may have an average particle diameter of about 10 nm to about 30 μm, for example, about 20 nm to about 150 nm, for example, about 40 to about 100 nm. When the silicon is in the form of acicular particles, each acicular particle may have a length of about 100 nm to about 160 nm, for example, about 108 nm to about 125 nm, and a thickness of about 10 nm to about 100 nm, for example, about 20 nm to about 50 nm, particularly, 40 nm.

Each of the first graphene and the second graphene may be a polycyclic aromatic molecule formed of a plurality of carbon atoms covalently bonded to one another, and the covalently bonded carbon atoms constitute a 6-membered carbon ring as a basic repeating unit, but the graphene may further include 5-membered and/or 7-membered carbon rings. As a result, the graphene appears as a single layer of covalently bonded carbon atoms (having $sp^2$ bonds). The graphene may be formed as a single layer. However, a plurality of graphene layers may be stacked to form a multilayer structure. For example, the graphene may have 1 layer to 100 layers, 2 layers to 100 layers, or 3 layers to 50 layers.

Each of the first graphene and the second graphene may have a structure of a nanosheet, a layer (film), a nanographene nanosheet, or a flake. The term "nanosheet" refers to an irregular structure of graphene formed on the silicon oxide and the term "layer" refers to a continuous, uniform film of graphene formed on the silicon oxide.

The second graphene may cover the surface of the silicon in whole or in part. When the silicon suboxide is positioned on silicon, the second graphene may cover the surface of the silicon suboxide in whole or in part. For example, a coverage ratio of the second graphene on the silicon or silicon suboxide may be from about 10% to about 99%, for example, from about 20% to about 95%, for example, from about 40% to about 90%, based on a surface area of either silicon or silicon suboxide. In addition, the first graphene may cover the surface of the porous silicon secondary particle in whole or in part. For example, a coverage ratio of the first graphene may be from about 10% to about 99%, for example, from about 20% to about 95%, for example, from about 40% to about 90%, based on a surface area of the porous silicon secondary particle.

The porous silicon composite according to an embodiment may have an aspherical shape and a sphericity of, for example, 0.9 or less, for example, about 0.7 to about 0.9, for example, about 0.85 to about 0.9. Throughout the specification, the term "porous silicon composite" indicates substantially the same meaning as "porous silicon secondary particle."

The first graphene and the second graphene may be any suitable carbonaceous material in the form of flakes, respectively. Examples of the carbonaceous material include graphene, graphite, carbon fiber, graphitic carbon, graphene oxide, or a combination thereof.

In the porous silicon composite according to an embodiment, a size of graphene may be from about 10 nm to about 100 nm. In this regard, the size refers to a diameter, or a length of a major axis.

In the porous silicon composite, amounts of the first graphene and the second graphene may be from about 0.1 parts by weight to about 2,000 parts by weight, for example, from about 0.1 parts by weight to about 300 parts by weight, for example, from about 0.1 parts by weight to about 90 parts by weight, particularly, from about 5 parts by weight to about 30 parts by weight based on 100 parts by weight of silicon, respectively. When the amount of each of the first graphene and the second graphene is within the ranges above, the first graphene and the second graphene may have improved effects with respect to suppressing volume expansion and improved conductivity. The first graphene and second graphene may be, for example, graphene flakes.

In the porous silicon secondary particle according to an embodiment, the first graphene is in the form of graphene flakes, and the graphene flakes extend from the silicon suboxide ($SiO_x$, $0<x<2$) by a distance of 1,000 nm or less, for example, 500 nm or less, for example, 10 nm or less, for example, 1 nm or less, for example, about 0.00001 nm to about 1 nm, include at least one graphene layer, for example, about 1 graphene layer to about 30 graphene layers, have a total thickness of about 0.6 nm to about 50 nm, for example, about 1 nm to about 50 nm, and are oriented at an angle of 0° to 90°, for example, 10° to 80°, for example, 20° to 70° with respect to a major axis (e.g., a Y axis) of the silicon.

In the silicon composite primary particle, the second graphene is in the form of graphene flakes, and the graphene flakes extend from the silicon suboxide ($SiO_x$, $0<x<2$) by a distance of about 10 nm or less, for example, about 5 nm or less, for example, about 3 nm or less, for example, about 1 nm or less, include graphene layers, have a total thickness of about 1,000 nm or less, for example, about 0.3 nm to about 1,000 nm, for example, about 0.3 nm to about 50 nm, for example, about 0.6 nm to about 50 nm, for example, about 1 nm to about 30 nm, and are oriented at an angle of 0° to 90°, for example, 10° to 80°, for example, 20° to 70° with respect to a major axis (e.g., a Y axis) of the silicon. In this regard, the major axis refers to the Y axis.

The silicon suboxide ($SiO_x$, $0<x<2$) may have a thickness of about 30 μm or less, for example, about 10 μm or less, for example, about 1 nm to about 100 nm, for example, about 10 nm. The silicon suboxide may cover the surface of silicon in whole or in part. A coverage ratio of the silicon suboxide may be from about 10% to about 99%, for example, from about 20% to about 95%, for example, from about 40% to about 90%, based on the surface area of silicon.

A lithium battery according to an embodiment includes the electrode. The electrode may be a negative electrode. The negative electrode may be prepared according to the above-described method.

Next, a positive electrode is prepared according to the following process.

A positive active material, a conductive agent, a binder, and a solvent are mixed to prepare a positive active material composition. The positive active material composition is directly coated on a metallic current collector and dried to prepare a positive electrode plate. Alternatively, the positive active material composition may be cast on a separate support, and a film separated from the support is laminated on a metallic current collector to prepare a positive electrode plate.

The positive active material may include at least one selected from lithium cobalt oxide, lithium nickel cobalt manganese oxide, lithium nickel cobalt aluminum oxide, lithium iron phosphorus oxide, and lithium manganese oxide. However, the positive active material is not limited thereto and any suitable positive active material used in the art may also be used.

For example, the positive active material may be any suitable lithium-containing metal oxide used in the art without limitation. For example, at least one composite oxide of lithium and a metal selected from cobalt, manganese, nickel, and any combination thereof, particularly, a compound represented by any one of the following formulae: $Li_aA_{1-b}B'_bD_2$ (where $0.90 \leq a \leq 1$ and $0 \leq b \leq 0.5$); $Li_aE_{1-b}B'_bO_{2-c}D_c$ (where $0.90 \leq a \leq 1$, $0 \leq \leq 0.5$, and $0 \leq c \leq 0.05$); $LiE_{2-b}B'_bO_{4-c}D_c$ (where $0 \leq b \leq 0.5$ and $0 \leq c \leq 0.05$); $Li_aNi_{1-b-c}Co_bB'_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cD_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Mn_bB'_cO_{2-\alpha}F=_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aN_ib_cE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$ may be used.

In the formulae above, A is nickel (Ni), cobalt (Co), manganese (Mn), or any combination thereof; B' is aluminum (Al), nickel (Ni), cobalt (Co), manganese (Mn), chromium (Cr), iron (Fe), magnesium (Mg), strontium (Sr), vanadium (V), a rare earth element, or any combination thereof; D is oxygen (O), fluorine (F), sulfur (S), phosphorus (P), or any combination thereof; E is cobalt (Co), manganese (Mn), or a combination thereof; F' is fluorine (F), sulfur (S), phosphorus (P), or any combination thereof; G is aluminum (Al), chromium (Cr), manganese (Mn), iron (Fe), magnesium (Mg), lanthanum (La), cerium (Ce), strontium (Sr), vanadium (V), or any combination thereof; Q is titanium (Ti), molybdenum (Mo), manganese (Mn), or any combination thereof; I' is chromium (Cr), vanadium (V), iron (Fe), scandium (Sc), yttrium (Y), or any combination thereof; and J is vanadium (V), chromium (Cr), manganese (Mn), cobalt (Co), nickel (Ni), copper (Cu), or any combination thereof.

The compounds listed above may have a coating layer on the surface thereof. Alternatively, a mixture of a compound without a coating layer and a compound having a coating layer, the compounds being selected from the compounds listed above, may be used. The coating layer may include a compound of a coating element, such as an oxide, hydroxide, oxyhydroxide, oxycarbonate, or hydroxycarbonate of the coating element. The compounds constituting the coating layer may be amorphous or crystalline. Examples of the coating element contained in the coating layer may be Mg, Al, Co, K, Na, Ca, Si, Ti, V, Sn, Ge, Ga, B, As, Zr or any mixture thereof. The coating layer may be formed on the compound, used as the positive active material, by using the coating element via any method, which does not adversely affect physical properties of the positive active material, for example, a spray coating method and an immersion method. The method is obvious to those of skill in the art, and thus a detailed description thereof will be omitted.

For example, the positive active material may be $LiNiO_2$, $LiCoO_2$, $LiMn_xO_{2x}$ (where x=1 or 2), $LiNi_{1-x}Mn_xO_2$ (where $0<x<1$), $LiNi_{1-x-y}Co_xMn_yO_2$ (where $0 \leq x \leq 0.5$ and $0 \leq y \leq 0.5$), $LiFeO_2$, $V_2O_5$, TiS, MoS, or the like.

The conductive agent, the binder, and the solvent of the positive active material composition may be the same as those of the negative active material composition. Also, a plasticizer may further be added to the positive active material composition and/or the negative active material composition to form pores inside the electrodes.

Amounts of the positive active material, the conductive agent, the binder, and the solvent may be the same levels as those used in lithium batteries. At least one of the conductive agent, the binder, and the solvent may be omitted in accordance with a purpose and a structure of the lithium battery.

Subsequently, a separator to be interposed between the positive electrode and the negative electrode is prepared. The separator may be any suitable separator used in the art. Any suitable separator having low resistance against migration of ions in the electrolyte and excellent electrolyte-retaining ability may be used. For example, glass fiber, polyester, Teflon, polyethylene, polypropylene, polytetrafluoroethylene (PTFE), or any combination thereof, each of which may be a non-woven or woven fabric may be used. For example, a windable separator including polyethylene, polypropylene, or the like may be used in lithium-ion batteries and a separator having excellent electrolyte-retaining capability may be used in lithium-ion polymer batteries. For example, the separator may be prepared according to the following method.

A polymer resin, a filler, and a solvent are mixed to prepare a separator composition. The separator composition may directly be coated on an electrode and dried to form a separator. Alternatively, the separator composition may be cast on a support and dried, and a separator film separated from the support may be laminated on an electrode to prepare a separator.

The polymer resin used to prepare the separator is not particularly limited and may be any suitable material used as a binder for electrode plates. For example, a vinylidenefluoride/hexafluoropropylene copolymer, polyvinylidene fluoride (PVDF), polyacrylonitrile, polymethylmethacrylate, or any suitable mixture thereof may be used.

The separator may include a ceramic component to improve performance of the separator as a film. For example, the separator may be coated with an oxide or may include ceramic particles in the preparation of the separator.

Subsequently, an electrolyte is prepared. For example, the electrolyte may be an organic electrolytic solution. In addition, the electrolyte may be a solid. For example, the electrolyte may be boron oxide, lithium oxynitride, or the like. However, the electrolyte is not limited thereto and any suitable material available as a solid electrolyte in the art may also be used. The solid electrolyte may be formed on the negative electrode by sputtering, or the like.

For example, the organic electrolytic solution may be prepared. The organic electrolytic solution may be prepared by dissolving a lithium salt in an organic solvent.

The organic solvent may be any suitable organic solvent used in the art. For example, the organic solvent may comprise propylenecarbonate, ethylenecarbonate, fluoroethylenecarbonate, butylenecarbonate, dimethylcarbonate, diethylcarbonate, methylethylcarbonate, methylpropylcarbonate, ethylpropylcarbonate, methylisopropylcarbonate, dipropylcarbonate, dibutylcarbonate, benzonitrile, acetonitrile, tetrahydrofuran, 2-methyltetrahydrofuran, y-butyrolactone, dioxolane, 4-methyldioxolane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethyleneglycol, dimethylether, or any mixture thereof.

The lithium salt may be any suitable lithium salt used in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or any mixture thereof.

Figure 13:
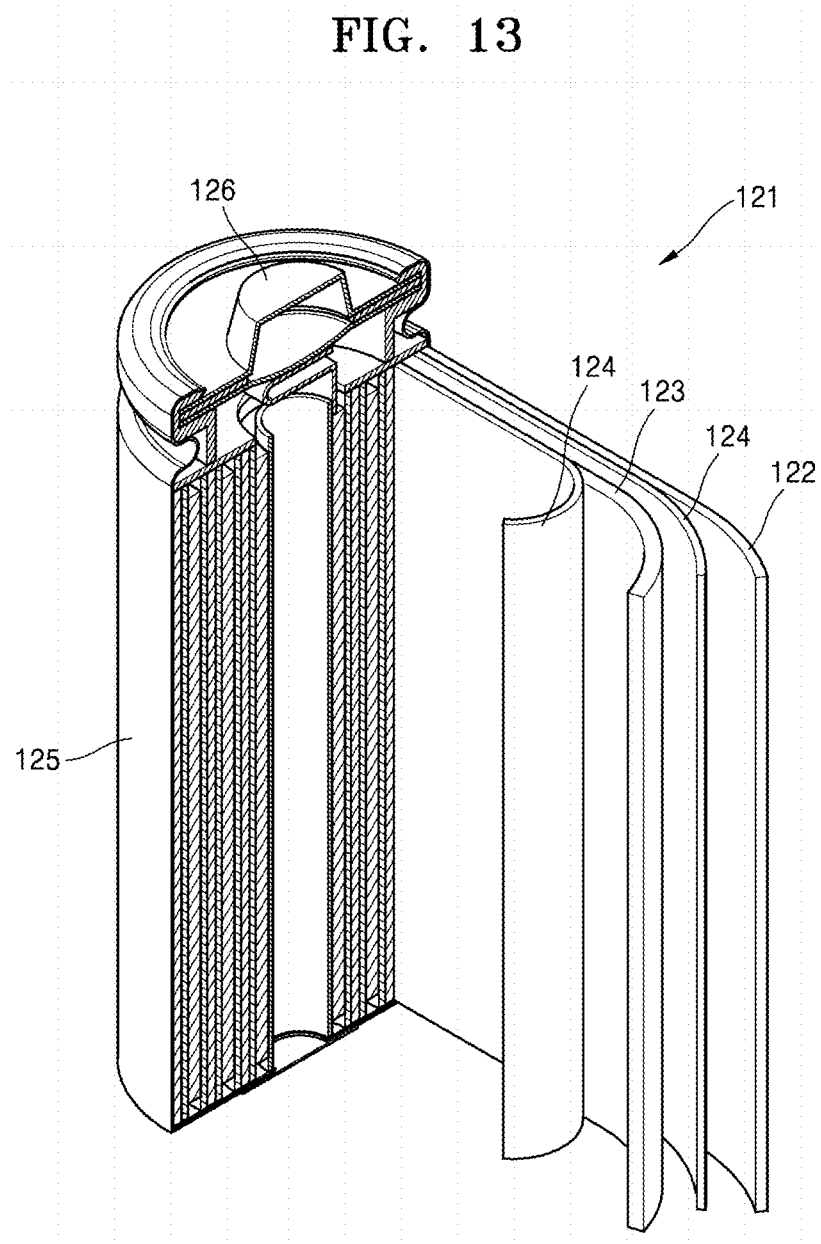
FIG. 13 is a schematic view of an embodiment of a lithium battery.

As illustrated in FIG. 13, a lithium battery 121 includes a positive electrode 123, a negative electrode 122, and a separator 124. The positive electrode 123, the negative electrode 122, and the separator 124 may be wound or folded, and then accommodated in a battery case 125. Then, the battery case 125 may be filled with an organic electrolytic solution and sealed with a cap assembly 126 to complete the manufacture of the lithium battery 121. The battery case 125 may be a cylindrical type, a rectangular type, or a thin-film type. For example, the lithium battery 121 may be a thin-film type battery. The lithium battery may be a lithium-ion battery.

The separator 124 may be interposed between the positive electrode 123 and the negative electrode 122 to form a battery assembly. A plurality of such battery assemblies may be stacked in a bi-cell structure and impregnated with an organic electrolytic solution. The resultant battery assembly may be put into a pouch and sealed to complete the manufacture of a lithium-ion polymer battery.

Also, a plurality of such battery assemblies may be stacked to form a battery pack which may be used in any devices that require high capacity and high output, for example, laptop computers, smartphones, and electric vehicles.

The lithium battery may be suitable for use as power sources for an electric vehicle (EV) due to its improved high rate characteristics and lifespan characteristics. For example, the lithium battery may be suitable for hybrid vehicles such as plug-in hybrid electric vehicles (PHEVs). For example, the lithium battery is suitable for a long-life electric vehicle with a fast charging characteristic.

Hereinafter, the present disclosure will be described in more detail according to the following examples and comparative examples. However, the following examples are merely presented to exemplify the present disclosure, and the scope of the present disclosure is not limited thereto.

EXAMPLES

Preparation Example 1

Preparation of Porous Silicon Composite 25 parts by weight of plate-like and acicular silicon was mixed with 10 parts by weight of stearic acid and 65 parts by weight isopropyl alcohol to prepare a composition. The composition was spray-dried, and then dried to obtain porous silicon secondary particles having an average particle diameter of about 4.5 μm. A silicon suboxide ($SiO_x$, 0<x<2) film (having a thickness of about 0.1 nm to about 10 nm) is formed on the surface of silicon.

The spray-drying was performed using a spray drier (Model No.: MMSD Micro Mist Spray Dryers, Fujisaki Electric). Isopropyl alcohol was dried under a $N_2$ atmosphere by adjusting a size and a pressure of a spray nozzle and a temperature of powder spraying atmosphere (about 200° C.) to prepare porous silicon composite secondary particles. A size of a spray nozzle was controlled to about 150 μm, and a pressure of a spray nozzle was adjusted to about 0.58 MPa.

The porous silicon secondary particles were loaded in to a reactor. The reactor was purged with nitrogen gas, and then a gas mixture of $CH_4$ and $CO_2$ (volume ratio of $CH_4$:$CO_2$=80:20), as a reaction gas, was flowed into the reactor to form an atmosphere of the gases. A pressure generated inside the reactor by the flow of the gases was 1 atm. Under the atmosphere of the gases, an internal temperature of the reactor was increased to 1000° C. (at a rate of about 23° C./min), and then while continuously suppling the gases into the reactor, heat treatment was performed at the temperature for 1 hour. Then, the resultant was maintained for about 3 hours. Then, the supply of the gases was stopped, the reactor was cooled to room temperature (25° C.), and nitrogen was purged in the reactor to obtain a porous silicon composite. In this regard, the porous silicon composite is in the form of clusters.

In the porous silicon composite, a total amount of a first graphene and a second graphene was about 25 parts by weight based on 100 parts by weight of a total weight of the porous silicon composite.

Preparation Example 2

Preparation of Graphene-Silica Composite (Graphene Sphere)

Fumed $SiO_2$ particles (having an average particle diameter of about 20 nm to about 30 nm) was loaded in a reactor, and an internal temperature of the reactor was increased to 1000° C. while supplying $CH_4$ into the reactor at a rate of about 300 sccm at 1 atm for about 30 minutes.

Then, heat treatment was performed at the temperature for 7 hours. Then, while purging the reactor with nitrogen, the internal temperature of the reactor was adjusted to room temperature (20 to 25° C.) to obtain a graphene-silica composite.

Example 1

Preparation of Negative Electrode and Full Cell

The porous silicon composite (SCN) prepared according to Preparation Example 1, artificial graphite (CG1, having a particle diameter of 11.7 μm and a specific surface area of 1.4 $m^2$/g), flake graphite (SFG6, Timcal, AG, having a particle diameter of 4 μm and a specific surface area of 17 $m^2$/g) as a carbonaceous conductive material, and the graphene-silica composite (GB, having a particle diameter of 50 nm and a specific surface area of 200 $m^2$/g) prepared according to Preparation Example 2 were dry-mixed in a mixer at about 1500 rpm for about 3 minutes to obtain a mixture.

Polyvinyl alcohol as a binder and water were added to the mixture and mixed at 25° C. for 40 minutes to obtain a negative active material slurry. Mixing ratios of the respective components in the negative active material slurry are shown in Table 1 below.

The negative active material slurry was coated on a copper (Cu) foil using a doctor blade to form a film having a thickness of 20 μm. The film was vacuum-dried at 130° C. for 3 hours and roll-pressed to prepare a negative electrode.

A positive electrode was prepared using a positive active material slurry obtained by mixing $LiNi_{0.6}Co_{0.2}Mn_{0.2}O_2$, $LiNi_{0.6}Co_{0.2}Al_{0.2}O_2$, Super P, polyvinylidene fluoride as a binder, and NMP as a solvent. In the slurry, a mixing weight ratio of $LiNi_{0.6}Co_{0.2}Mn_{0.2}O_2$, $LiNi_{0.6}Co_{0.2}Al_{0.2}O_2$, Super P, and polyvinylidene fluoride as the binder was 75.2:18.8:3:3.

A full cell was prepared using the negative electrode and the positive electrode. The positive active material slurry was coated on an aluminum (Al) foil using a doctor blade to form a film having a thickness of 40 μm. The film was vacuum-dried at 120° C. for 2 hours and roll-pressed to prepare a positive electrode.

A polypropylene film (Celgard 3510) was used as a separator, and an electrolyte prepared by dissolving 1.15 M $LiPF_6$ in a mixed solvent of EC, EMC, and DMC (mixed in a volumetric ratio of 2:4:4) was used. Here, EC is ethylene carbonate, EMC is ethylmethyl carbonate, and DMC is dimethyl carbonate.

TABLE 1

| Example | Active material (parts by weight) | | Composite conducting agent | | Amount of composite conducting agent | Binder | Amount of GB (parts by weight) |
| --- | --- | --- | --- | --- | --- | --- | --- |
| | SCN | CG1 | SFG6 | GB | | | |
| Example 1 | 12.8 | 82.2 | 4.5 | 0.5 (specific surface area: 200 m²/g) | 5 parts by weight | 4.2 | 10 parts by weight |
| Example 2 | 12.8 | 84.2 | 4 | 1 (specific surface area: 100 m²/g) | 4.9 parts by weight | 4.2 | 20 parts by weight |
| Example 3 | 12.8 | 82.2 | 4.75 | 0.25 (specific surface area: 200 m²/g) | 5 parts by weight | 4.2 | 5 parts by weight |
| Example 3a | 12.8 | 84.2 | 4 | 1 (specific surface area: 200 m²/g) | 4.9 parts by weight | 4.2 | 20 parts by weight |

In Table 1, the amount of the composite conducting agent is calculated based on 100 parts by weight of a total weight of the active material and the conductive agent, and the amount of GB is calculated based on 100 parts by weight of a total weight of the composite conducting agent (total weight of SFG6+GB).

Examples 2, 3, and 3a

Preparation of Negative Electrode and Full Cell

Full cells were prepared in the same manner as in Example 1, except that the composition of the negative active material slurry was changed as shown in Table 1.

Comparative Example 1

Preparation of Negative Electrode and Full Cell

A full cell was prepared in the same manner as in Example 1, except that a negative electrode was prepared according to the following process.

The porous silicon composite (SCN) prepared according to Preparation Example 1, artificial graphite (CG1), flake graphite (SFG6, Timcal, AG, having a particle diameter of 4 μm) as a carbonaceous conductive material, polyvinylalcohol (PVA) as a binder, and water were mixed at 25° C. for 40 minutes to prepare a negative active material slurry. Mixing ratios of the respective components in the negative active material slurry are shown in Table 2 below. The negative active material slurry was coated on a Cu-foil using a doctor blade to form a film having a thickness of 20 μm. The film was vacuum-dried at 130° C. for 3 hours and roll-pressed to prepare a negative electrode.

TABLE 2

| Example | Negative active material (parts by weight) SCN | Negative active material (parts by weight) CG1 | Conductive agent (parts by weight) Carbonaceous first conductive agent | Conductive agent (parts by weight) Carbonaceous second conductive agent | Binder (parts by weight) | Amount of GB (parts by weight) |
|---|---|---|---|---|---|---|
| Comparative Example 1 | 12.8 | 87.2 | SFG6 5 parts by weight | — | 4.2 | — |
| Comparative Example 2 | 12.8 | 82.3 | SFG6 4 parts by weight | Ketchen black (KB, 600JD) (specific surface area: 1270 m$^2$/g) 1 part by weight | 4.2 | — |
| Comparative Example 1a | 12.8 | 82.3 | SFG6 4.4 parts by weight | GB (specific surface area: 200 m$^2$/g) 1.24 parts by weight | 4.2 | 22 |

In Table 2, the amount of the conductive agent was calculated based on 100 parts by weight of the total weight of the negative active material and the conductive agent, and the amount of GB is calculated based on 100 parts by weight of a total weight of the conductive agent.

Comparative Example 2

Preparation of Negative Electrode and Full Cell

A full cell was prepared in the same manner as in Comparative Example 1, except that the composition of the negative active material slurry was changed as shown in Table 2.

Comparative Example 1a

Preparation of Negative Electrode and Full Cell

A full cell was prepared in the same manner as in Comparative Example 1, except that the composition of the negative active material slurry was changed as shown in Table 2.

Example 4

Preparation of Negative Electrode and Coin Half Cell

The porous silicon composite (SCN) prepared according to Preparation Example 1, artificial graphite (CG1, having a particle diameter of 11.7 μm and a specific surface area of 1.4 m$^2$/g), flake graphite (SFG6, Timcal, AG, having a particle diameter of 4 μm and a specific surface area of 17 m$^2$/g) as a carbonaceous conductive material, and the graphene-silica composite (GB, having a particle diameter of 50 nm and a specific surface area of 100 m$^2$/g) were dry mixed in a mixer at about 1500 rpm for about 3 minutes to obtain a mixture.

A binder and water were added to the dry mixed mixture and mixed at 25° C. for 40 minutes to obtain a negative active material slurry. Mixing ratios of the respective components in the negative active material slurry are as shown in Table 1 above.

The negative active material slurry was coated on a Cu foil using a doctor blade to form a film having a thickness of 20 μm. The film was vacuum-dried at 130° C. for 3 hours and roll-pressed to prepare a negative electrode.

A coin half cell was prepared using the negative electrode and lithium metal as a counter electrode.

A polypropylene film (Celgard 3510) was used as a separator, and an electrolyte prepared by dissolving 1.0 M LiPF$_6$ in a mixed solvent of ethylene carbonate (EC), diethyl carbonate (DEC), and fluoroethylene carbonate (FEC) (mixed in a volumetric ratio of 5:70:25) was used.

Examples 5 and 6

Preparation of Negative Electrode and Coin Half Cell

Coin half cells were prepared in the same manner as in Example 4, except that the negative electrodes respectively prepared according to Examples 2 and 3 were used.

Example 6a

Preparation of Negative Electrode and Coin Half Cell

A coin half cell was prepared in the same manner as in Example 4, except that the negative electrode prepared according to Example 3a was used.

Comparative Examples 3 and 4

Preparation of Negative Electrode and Coin Half Cell

Coin half cells were prepared in the same manner as in Example 4, except that the negative electrodes respectively prepared according to Comparative Examples 1 and 2 were used.

Comparative Example 3a

Preparation of Negative Electrode and Coin Half Cell

Coin half cell was prepared in the same manner as in Example 4, except that the negative electrode prepared according to Comparative Example 1a was used.

Evaluation Example 1

Electron Microscope Analysis

The negative electrodes of the full cells prepared according to Example 1 and Comparative Example 1 were analyzed by scanning electron microscopy (SEM) and energy-dispersive spectroscopy (EDS). Nova NanoSem 450S, (FEI) was used as a scanning electron microscope.

Figure 3A:
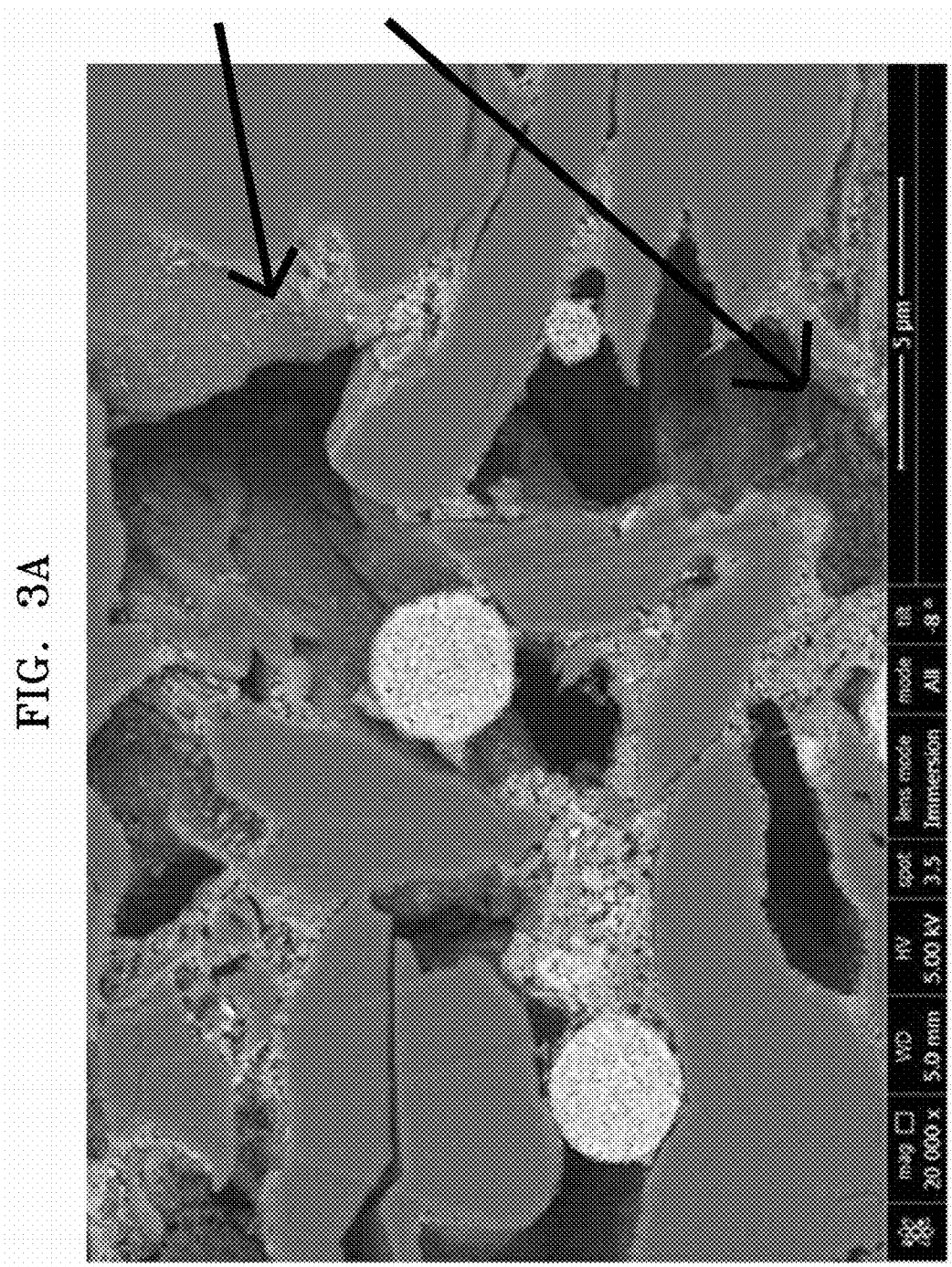
FIG. 3A is a scanning electron microscope (SEM) image of a negative electrode of a full cell prepared according to Example 1.

Electron microscope analysis results of the negative electrodes of the full cells according to Example 1 and Comparative Example 1 are shown in FIGS. 3A and 4A, respectively. Areas indicated by arrows in FIG. 3A are areas where the graphene-silica composite is observed.

Figure 4:
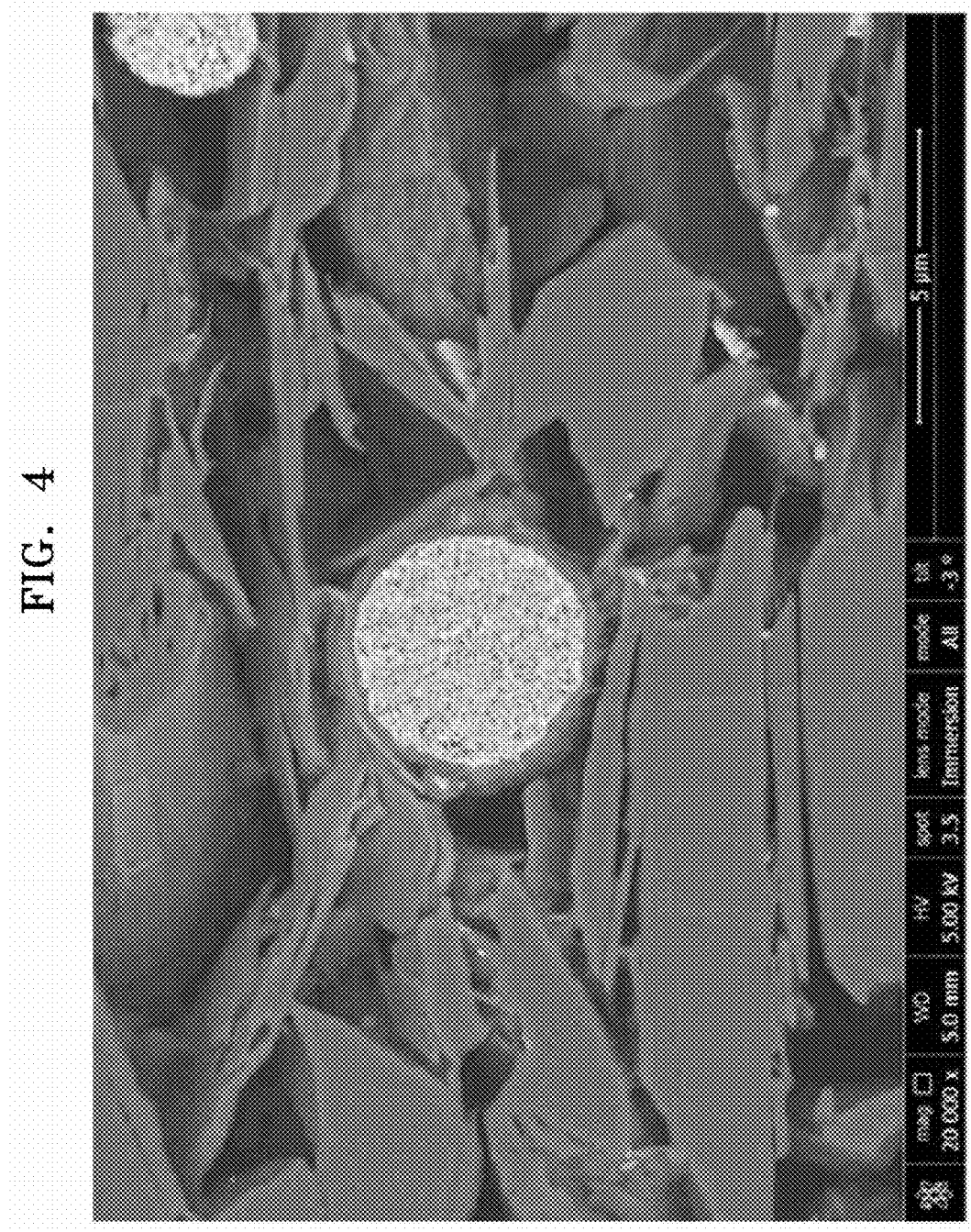
FIG. 4 is an SEM image of a negative electrode of a full cell prepared according to Comparative Example 1.
Figure 5:
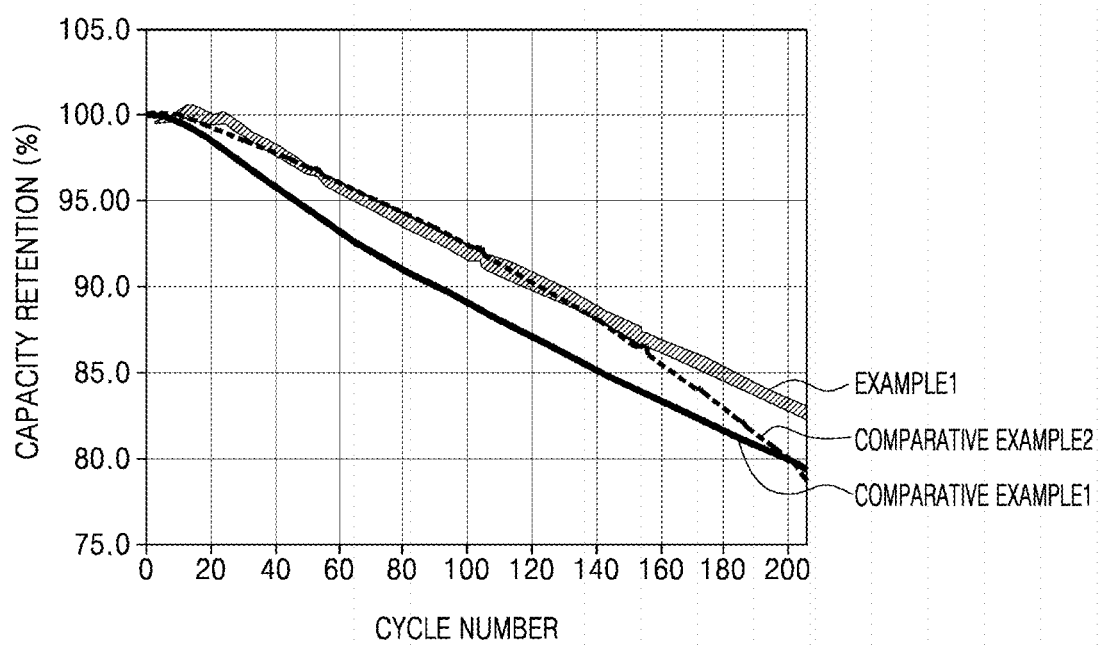
FIG. 5 is a graph of capacity retention (percent) versus cycle number illustrating capacity retention for full cells prepared according to Example 1 and Comparative Examples 1 and 2.
Figure 6A:
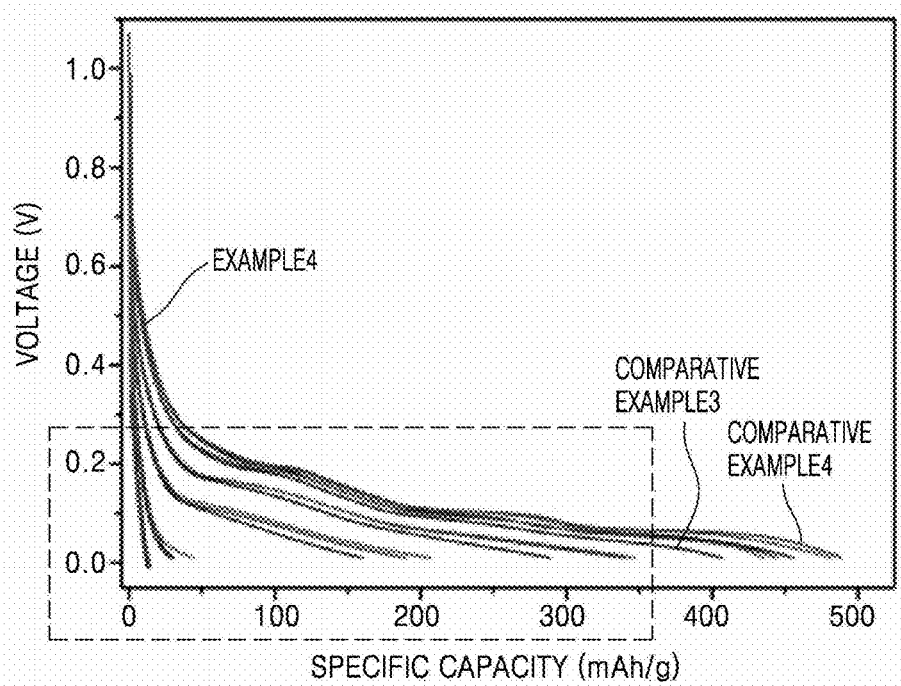
FIGS. 6A to 6D are graphs of voltage (volts, V) versus specific capacity (milliampere-hours per gram, mAh/g) illustrating rate characteristics of coin half-cells prepared according to Example 4 and Comparative Examples 3 and 4 during charge and discharge tests.
Figure 6B:
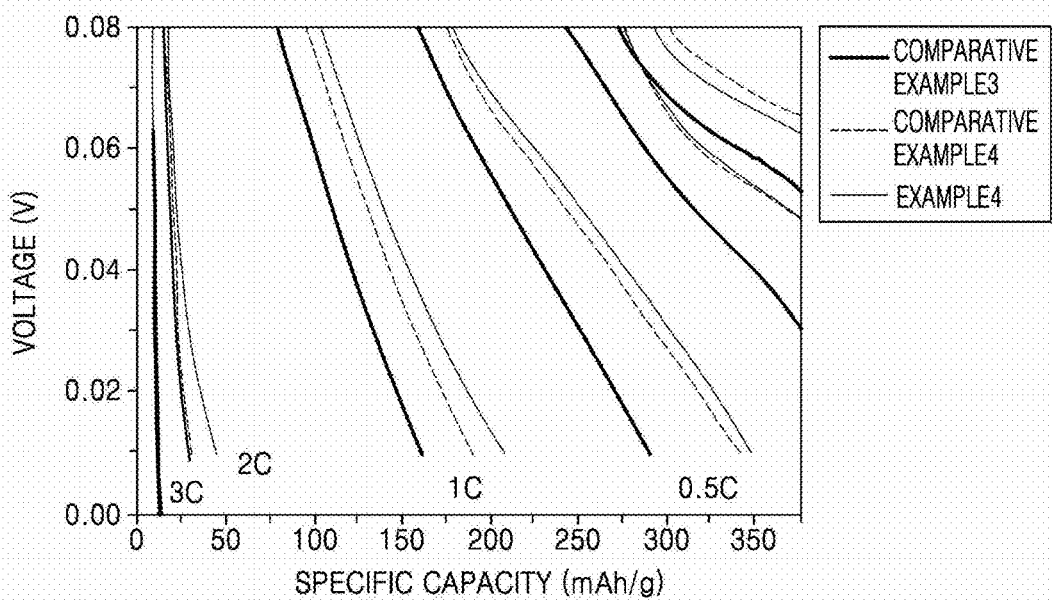
Figure 6C:
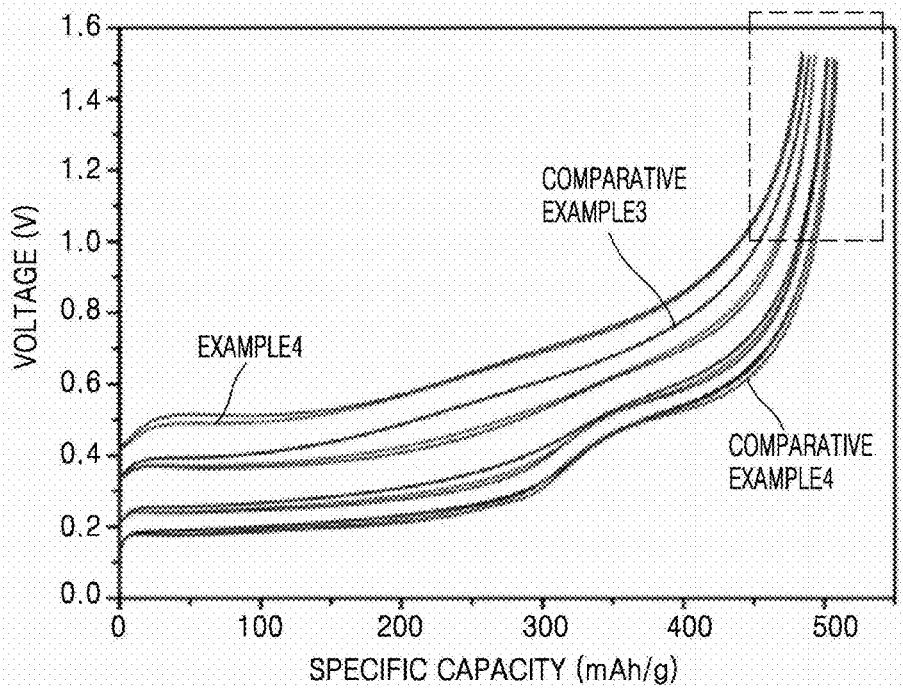
Figure 6D:
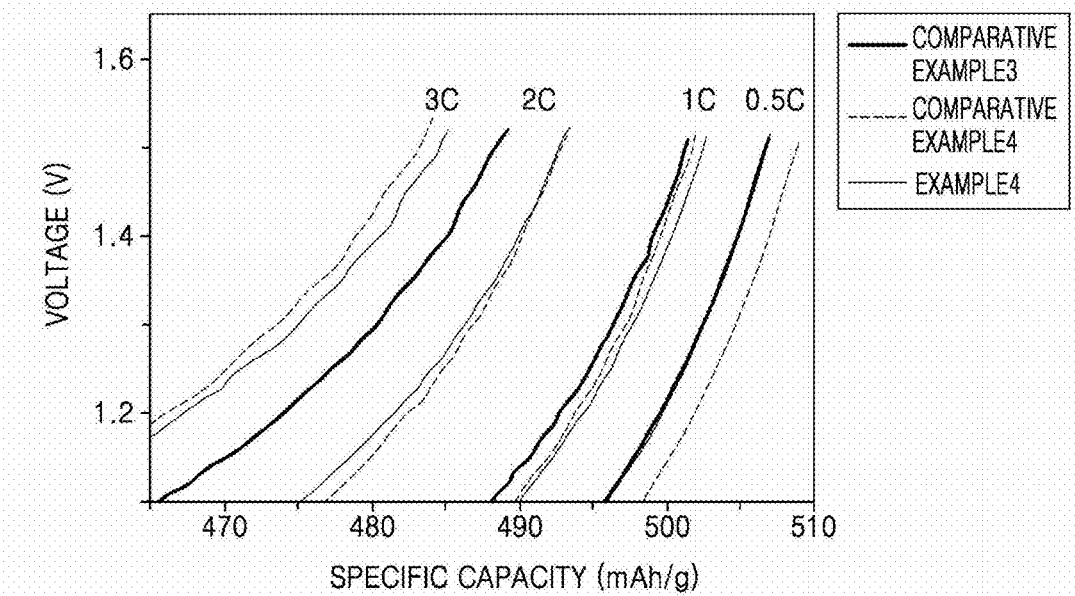

As shown in FIGS. 3A and 4, it was confirmed that spherical particles of the graphene-silica composite having a size of several tens of nanometers are uniformly dispersed around the active material and the carbonaceous conductive material in the negative electrode according to Example 1, unlike the negative electrode according to Comparative Example 1.

Evaluation Example 2

EDS Mapping Analysis

The negative electrode of the full cell prepared according to Example 1 was subjected to EDS mapping analysis. Nova NanoSem 450S EDS, manufactured by FEI, was used as an analyzer of the EDS mapping analysis.

Figure 3B:
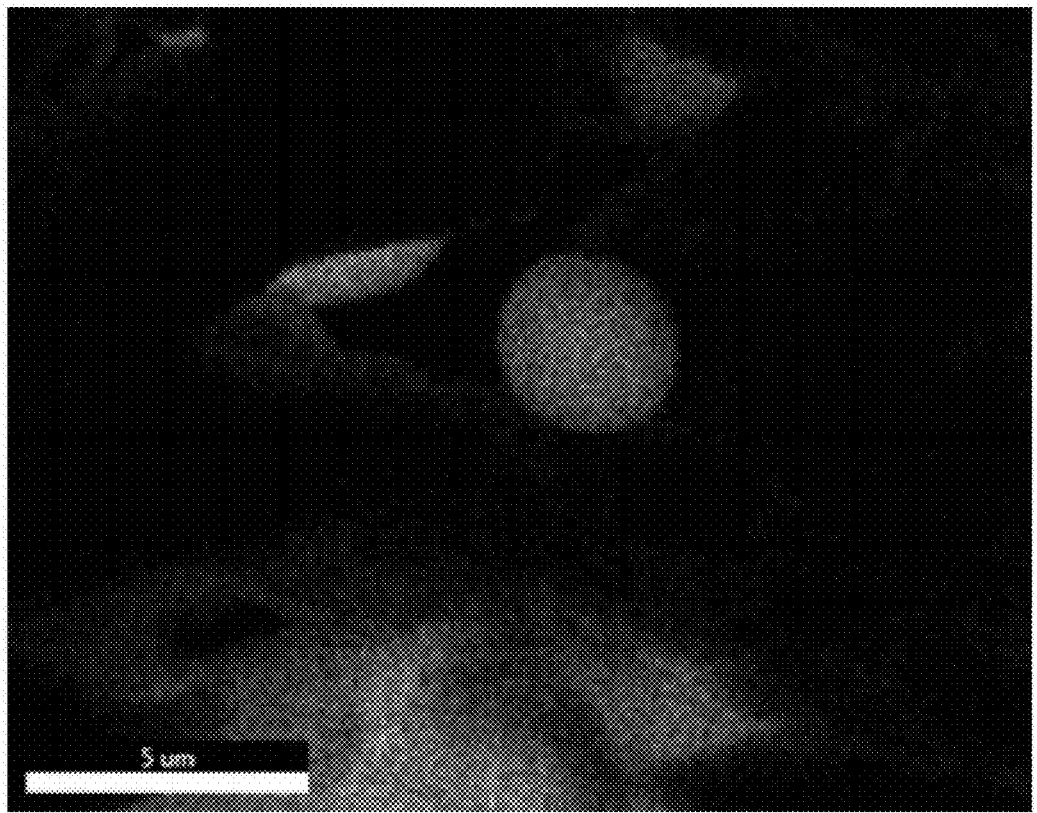
FIG. 3B shows the results of energy-dispersive spectroscopy (EDS) analysis of the negative electrode of the full cell prepared according to Example 1.

EDS analysis results of the negative electrode of the full cell according to Example 1 are shown in FIG. 3B.

As shown in FIG. 3B, silicon was detected in a porous silicon composite area, and it was confirmed that silicon of the graphene-silica composite was dispersed throughout the negative electrode.

Evaluation Example 3

Charging and Discharging Characteristics of Coin Full Cell

Charging and discharging characteristics of the coin full cells respectively prepared according to Examples 1 to 3 and Comparative Examples 1 and 2 were evaluated according to the following method. Charging and discharging were repeated 100 cycles.

Charging and discharging conditions (Charge: 1.0 C/Cutoff: 4.2 V–0.01 C, Discharge: 1.0 C/Cutoff: 2.5 V)

The lithium batteries were charged with a constant current at a C-rate of 0.1 C at 25° C. until a voltage reached 4.2 V (vs. Li), and then while maintaining the voltage of 4.2 V in a constant voltage mode, the charging process was cut off at a C-rate of 0.01 C. Subsequently, the lithium batteries were discharged with a constant current at a C-rate of 0.1 C until the voltage reached 2.5 V (vs. Li) ($1^{st}$ cycle, formation cycle).

The lithium batteries having gone through the 1st cycle were charged with a constant current at a C-rate of 0.2 C at 25° C. until the voltage reached 4.2 V (vs. Li), and then while maintaining the voltage of 4.2 V in a constant voltage mode, the charging process was cut off at a C-rate of 0.01 C. Subsequently, the lithium batteries were discharged with a current rate of 0.2 C until the voltage reached 2.5 V (vs. Li) ($2^{nd}$ cycle).

The lithium batteries having gone through the $2^{nd}$ cycle were charged with a constant current at a C-rate of 1.0 C at 25° C. until the voltage reached 4.2 V (vs. Li), and then while maintaining the voltage of 4.2 V in a constant voltage mode, the charging process was cut off at a C-rate of 0.01 C. Subsequently, the lithium batteries were discharged with a constant current at a C-rate of 1.0 C until the voltage reached 2.5 V (vs. Li) ($3^{rd}$ cycle). This charging/discharging cycle was repeated 200 times under the same conditions up to a $203^1$d cycle).

The lithium batteries were rested for 10 minutes after every charging/discharging cycle.

A capacity retention of the coin full cell is defined by Equation 1 below.

Capacity retention [%]=[discharge capacity at $203^{rd}$ cycle/discharge capacity at $3^{rd}$ cycle]×100%  Equation 1

Figure 10:
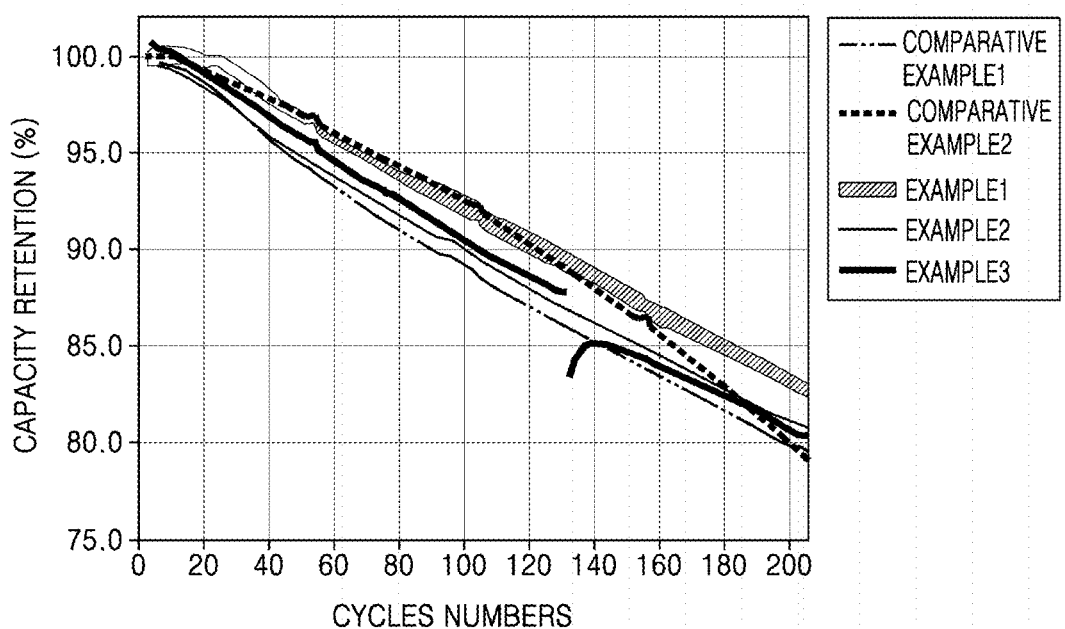
FIG. 10 is a graph of capacity retention (percent) versus cycle number illustrating capacity retention of coin full cells prepared according to Examples 1, 2, and 3, and Comparative Examples 1 and 2.

Some of charging/discharging test results are shown in FIG. 10 and Table 3 below.

TABLE 3

| Example | Capacity retention (%) |
|---|---|
| Example 1 | 82.9 |
| Example 2 | 80.6 |
| Example 3 | 79.7 |
| Example 3a | 80.3 |
| Comparative Example 1 | 79.5 |
| Comparative Example 2 | 79.2 |

As shown in FIG. 10 and Table 3, it was confirmed that the coin full cells prepared according to Examples 1, 2, 3, and 3a had improved capacity retention ratios in comparison with those according to Comparative Examples 1 and 2.

Evaluation Example 4

Charging and Discharging Characteristics of Coin Half Cell

Charging and discharging characteristics of the coin half cells respectively prepared according to Examples 4 to 6 and Comparative Examples 3, 4, and 3a were evaluated according to the following method. 0

The lithium batteries were charged with a constant current at a C-rate of 0.1 C at 25° C. until a voltage reached 0.01 V (vs. Li), and then while maintaining the voltage of 0.01 V in a constant voltage mode, the charging process was cut off at a C-rate of 0.01 C. Subsequently, the lithium batteries were discharged with a constant current at a C-rate of 0.1 C until the voltage reached 1.5 V (vs. Li) (1st cycle, formation cycle).

The lithium batteries having gone through the $1^{st}$ cycle were charged with a constant current at a C-rate of 0.1 C at 25° C. until the voltage reached 0.01 V (vs. Li) and discharged with a constant current at a C-rate of 0.1 C until the voltage reached 1.5 V (vs. Li) (0.1 C charging rate characteristic evaluation cycle).

The lithium batteries having gone through the 0.1 C charging rate characteristic evaluation cycle were charged with a constant current at a C-rate of 0.2 C at 25° C. until the voltage reached 0.01 V (vs. Li) and discharged with a constant current at a C-rate of 0.2 C until the voltage reached 1.5 V (vs. Li) (0.2 C charging rate characteristic evaluation cycle).

The lithium batteries having gone through the 0.2 C charging rate characteristic evaluation cycle were charged with a constant current at a C-rate of 0.5 C at 25° C. until the voltage reached 0.01 V (vs. Li) and discharged with a constant current at a C-rate of 0.2 C until the voltage reached 1.5 V (vs. Li) (0.5 C charging rate characteristic evaluation cycle).

The lithium batteries having gone through the 0.5 C charging rate characteristic evaluation cycle were charged with a constant current at a C-rate of 1.0 C at 25° C. until the voltage reached 0.01 V (vs. Li) and discharged with a constant current at a C-rate of 0.2 C until the voltage reached 1.5 V (vs. Li) (1.0 C charging rate characteristic evaluation cycle).

The lithium batteries having gone through the 1.0 C charging rate characteristic evaluation cycle were charged with a constant current at a C-rate of 2.0 C at 25° C. until the voltage reached 0.01 V (vs. Li) and discharged with a constant current at a C-rate of 0.2 C until the voltage reached 1.5 V (vs. Li) (2.0 C charging rate characteristic evaluation cycle).

The lithium batteries having gone through the 2.0 C charging rate characteristic evaluation cycle were charged with a constant current at a C-rate of 3.0 C at 25° C. until the voltage reached 0.01 V (vs. Li) and discharged with a constant current at a C-rate of 0.2 C until the voltage reached 1.5 V (vs. Li) (3.0 C charging rate characteristic evaluation cycle).

The lithium batteries having gone through the 1st cycle were charged with a constant current at a C-rate of 0.2 C at 25° C. until the voltage reached 0.01 V (vs. Li), and then while maintaining the voltage of 0.01 V in a constant voltage mode, the charging process was cut off at a C-rate of 0.01 C. Subsequently, the lithium batteries were discharged with a constant current at a C-rate of 0.2 C until the voltage reached 1.5 V (vs. Li) (0.2 C discharging rate characteristic evaluation cycle)

The lithium batteries having gone through the 0.2 C discharging rate characteristic evaluation cycle were charged with a constant current at a C-rate of 0.2 C at 25° C. until the voltage reached 0.01 V (vs. Li), and then while maintaining the voltage of 0.01 V in a constant voltage mode, the charging process was cut off at a C-rate of 0.01 C. Subsequently, the lithium batteries were discharged with a constant current at a C-rate of 0.5 C until the voltage reached 1.5 V (vs. Li) (0.5 C discharging rate characteristic evaluation cycle).

The lithium batteries having gone through the 0.5 C discharging rate characteristic evaluation cycle were charged with a constant current at a C-rate of 0.2 C at 25° C. until the voltage reached 0.01 V (vs. Li), and then while maintaining the voltage of 0.01 V in a constant voltage mode, the charging process was cut off at a C-rate of 0.01 C. Subsequently, the lithium batteries were discharged with a constant current at a C-rate of 1.0 C until the voltage reached 1.5 V (vs. Li) (1.0 C discharging rate characteristic evaluation cycle).

The lithium batteries having gone through the 1.0 C discharging rate characteristic evaluation cycle were charged with a constant current at a C-rate of 0.2 C at 25° C. until the voltage reached 0.01 V (vs. Li), and then while maintaining the voltage of 0.01 V in a constant voltage mode, the charging process was cut off at a C-rate of 0.01 C. Subsequently, the lithium batteries were discharged with a constant current at a C-rate of 2.0 C until the voltage reached 1.5 V (vs. Li) (2.0 C discharging rate characteristic evaluation cycle).

The lithium batteries having gone through the 2.0 C discharging rate characteristic evaluation cycle were charged with a constant current at a C-rate of 0.2 C at 25° C. until the voltage reached 0.01 V (vs. Li), and then while maintaining the voltage of 0.01 V in a constant voltage mode, the charging process was cut off at a C-rate of 0.01 C. Subsequently, the lithium batteries were discharged with a constant current at a C-rate of 3.0 C until the voltage reached 1.5 V (vs. Li) (3.0 C discharging rate characteristic evaluation cycle).

The lithium batteries were rested for 10 minutes after every charging/discharging cycle.

Initial efficiency is defined by Equation 2 below.

$$\text{Initial efficiency (\%)} = [\text{discharge capacity at } 1^{st} \text{ cycle/charge capacity at } 1^{st} \text{ cycle}] \times 100\% \quad \text{Equation 2}$$

Figure 11A:
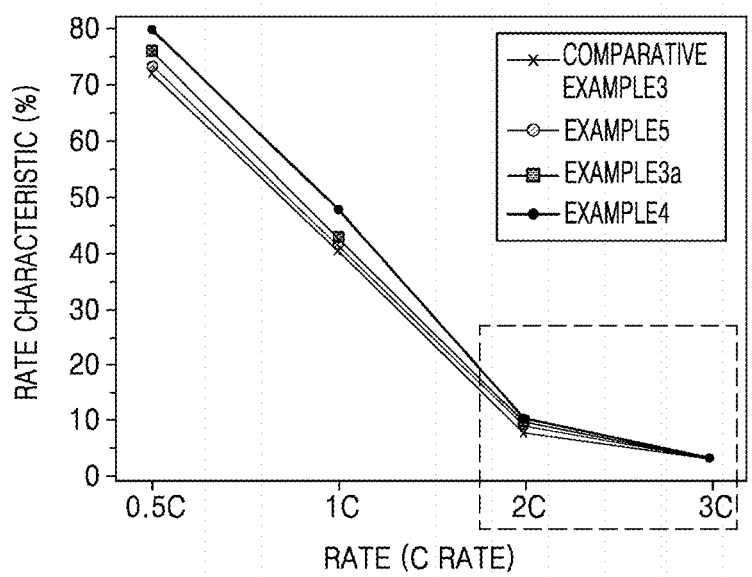
FIG. 11A is a graph of rate characteristic (percent, %) versus rate (C rate) illustrating rate characteristics of coin half cells prepared according to Examples 3a, 4, 5, and Comparative Example 3 during charge and discharge tests.
Figure 11B:
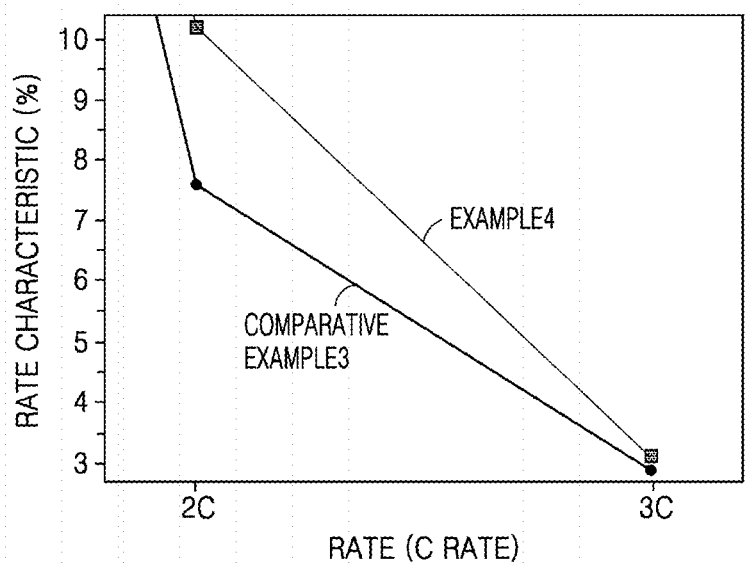
FIG. 11B is a graph of rate characteristic (percent, %) versus rate (C rate) illustrating rate characteristics of coin half-cells prepared according to Example 4 and Comparative Example 3 during charge and discharge tests.

During the charging and discharging tests, rate characteristics of the coin half cells prepared according to Example 4, Comparative Example 3, and Comparative Example 4 are shown in FIGS. 6A to 6D. In addition, rate characteristics of the coin half cells prepared according to Examples 4, 5 and 6a and Comparative Example 3 are shown in FIGS. 11A. 11B, and 12. FIG. 11B is an enlarged view of a region with dashed lines of FIG. 11A.

Initial efficiencies are shown in Table 4 below.

TABLE 4

| Example | Initial efficiency (%) |
| --- | --- |
| Example 4 | 89.7 |
| Example 5 | 88.6 |
| Example 6 | 89.9 |
| Example 6a | 87.9 |
| Comparative Example 3 | 89.3 |
| Comparative Example 4 | 88.4 |
| Comparative Example 3a | 87.1 |

Figure 12:
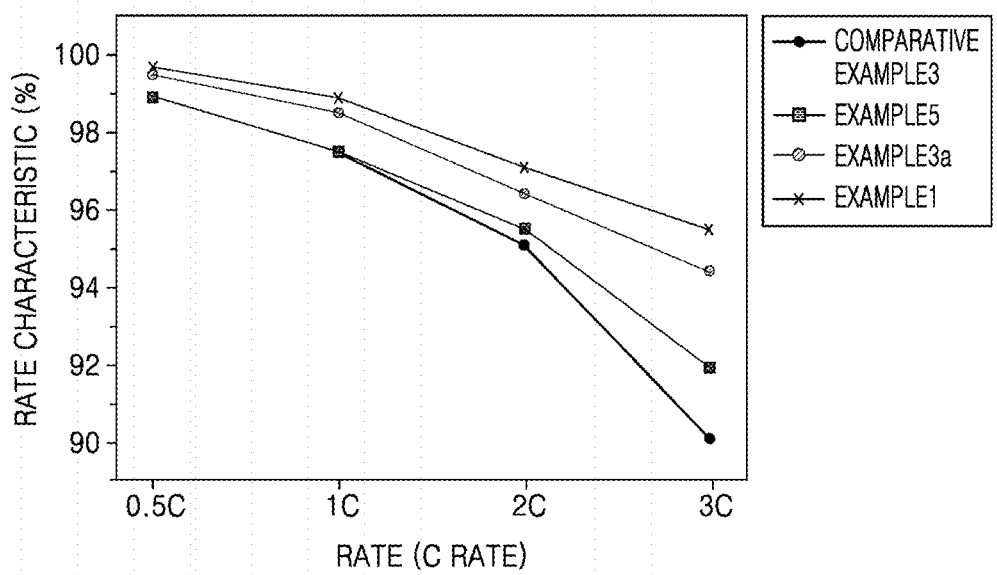
FIG. 12 is a graph illustrating rate characteristic (percent, %) versus rate (C rate) illustrating rate characteristics of coin half cells prepared according to Example 1, 3a, 5 and Comparative Example 3 during charge and discharge tests.

Referring to FIGS. 6A to 6D, it was confirmed that the coin half cell according to Example 4 had improved charging and discharging rate characteristics in comparison with the coin half cells prepared according to Comparative Examples 3 and 4. In addition, as shown in Table 4, the coin half cells according to Examples 4 to 6, and 6a had increased initial efficiencies in comparison with the coin half cell according to Comparative Example 4. Also, as shown in FIGS. 11A, 11B, and 12, the coin half cells according to Examples 4, 5 and 6a had improved charging and discharging high rate characteristics in comparison with the coin half cell according to Comparative Example 3.

Evaluation Example 5

SEM Analysis After Charging and Discharging

Charging and discharging characteristics of the coin full cells respectively prepared according to Example 1, Comparative Example 1, and Comparative Example 2 were evaluated in the same manner as in Evaluation Example 3 to observe cross-sections of negative electrodes before the charging and discharging test and after performing 200 cycles of charging and discharging using a scanning electron microscope.

Figure 7A:
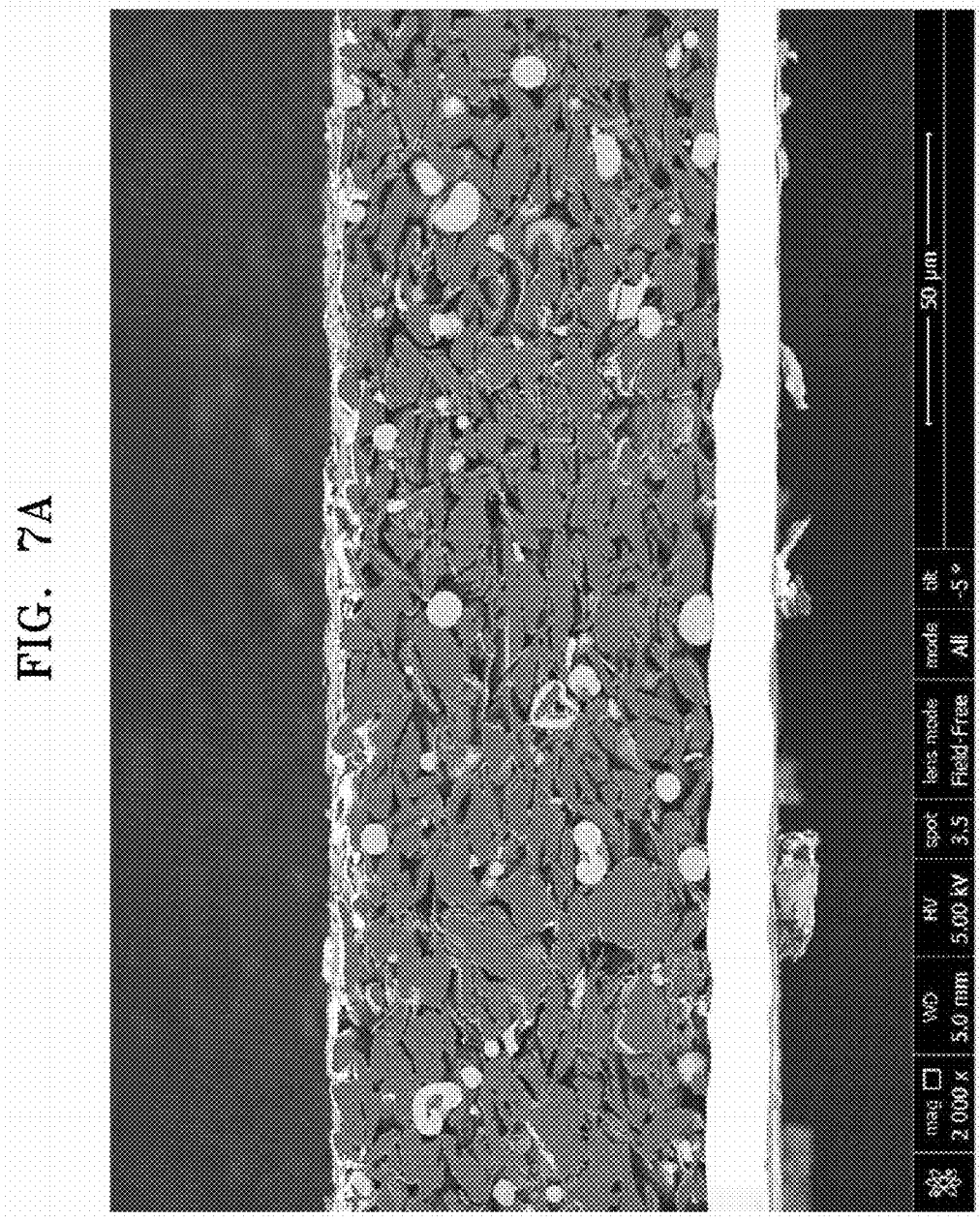
FIGS. 7A and 7B are SEM images of the full cell prepared according to Example 1 before charging and discharging cycles and after 200 cycles, respectively.
Figure 7B:
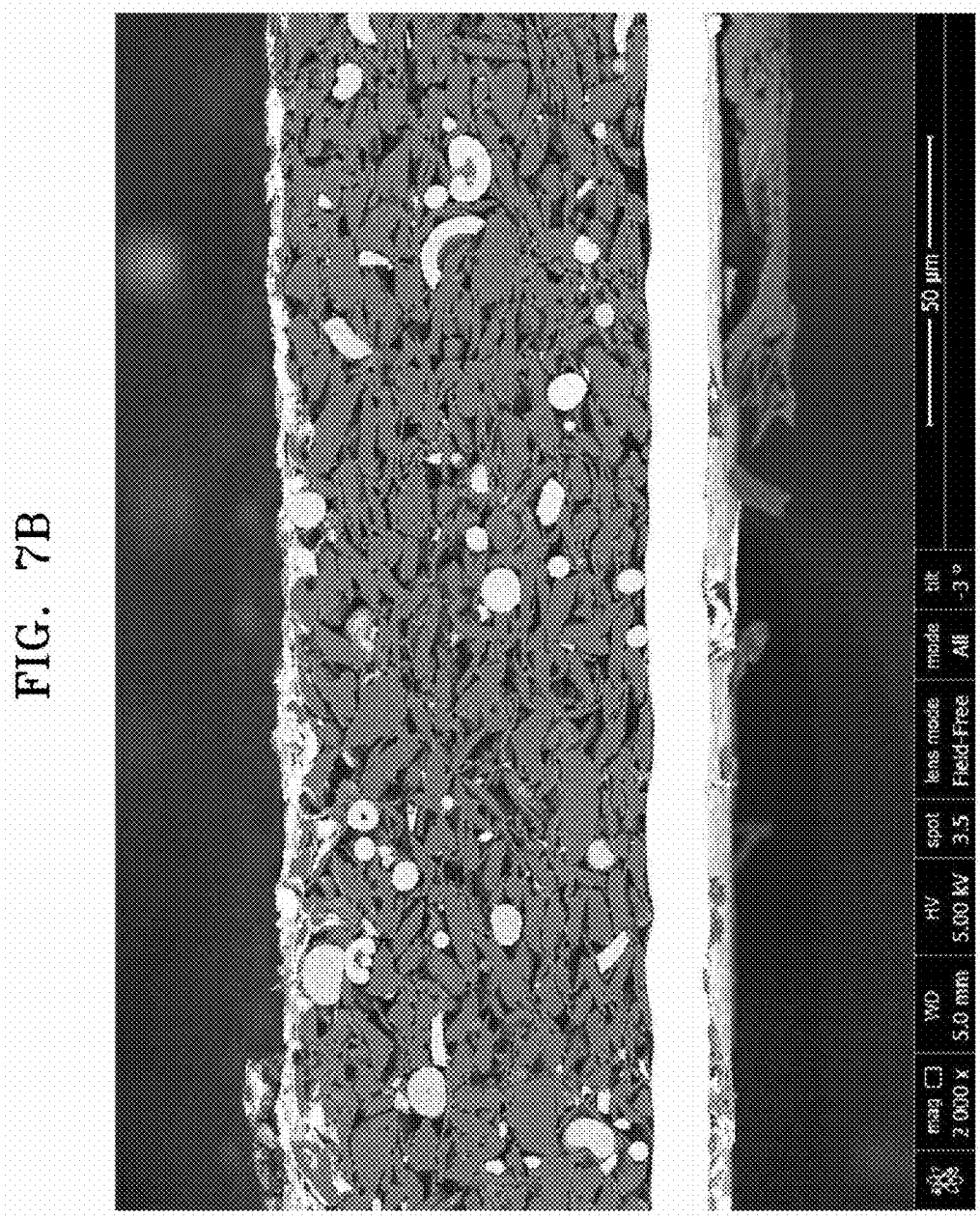

FIGS. 7A and 7B show cross-sections of the negative electrode of the coin full cells prepared according to Example 1 before the charging and discharging cycles and after repeating 200 cycles of charging and discharging, respectively.

Figure 8A:
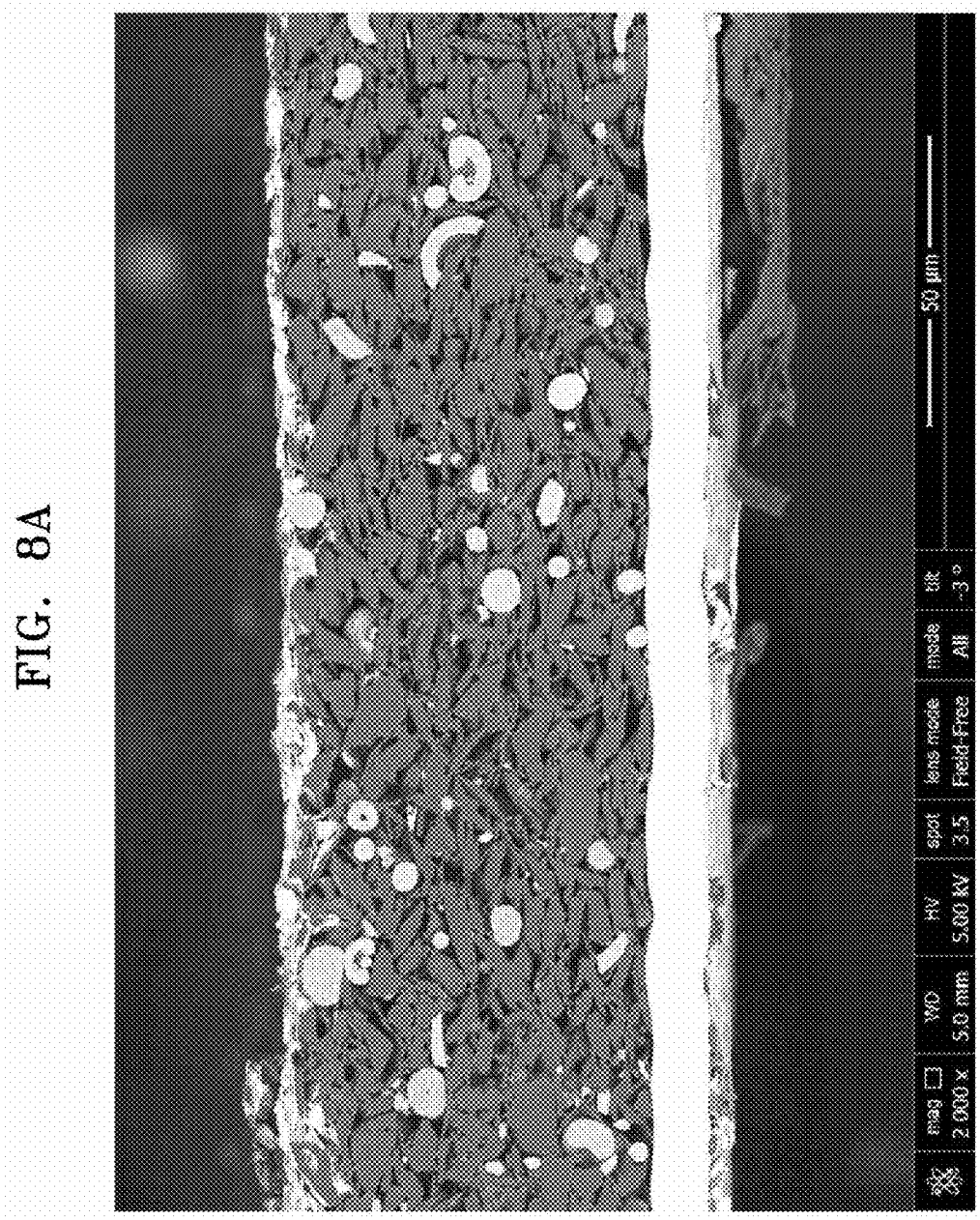
FIGS. 8A and 8B are SEM images of the full cell prepared according to Comparative Example 1 before charging and discharging cycles and after 200 cycles, respectively.
Figure 8B:
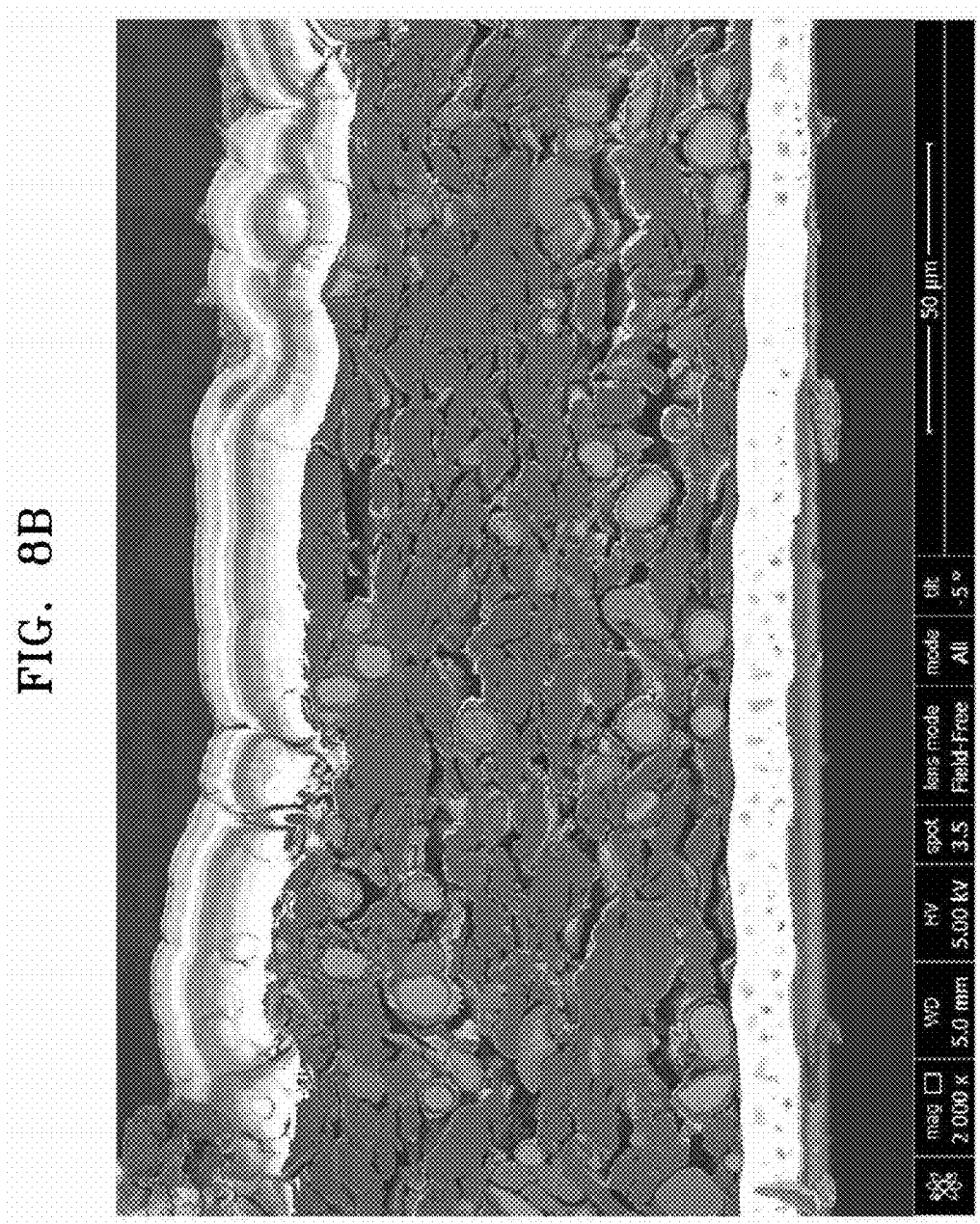
Figure 9A:
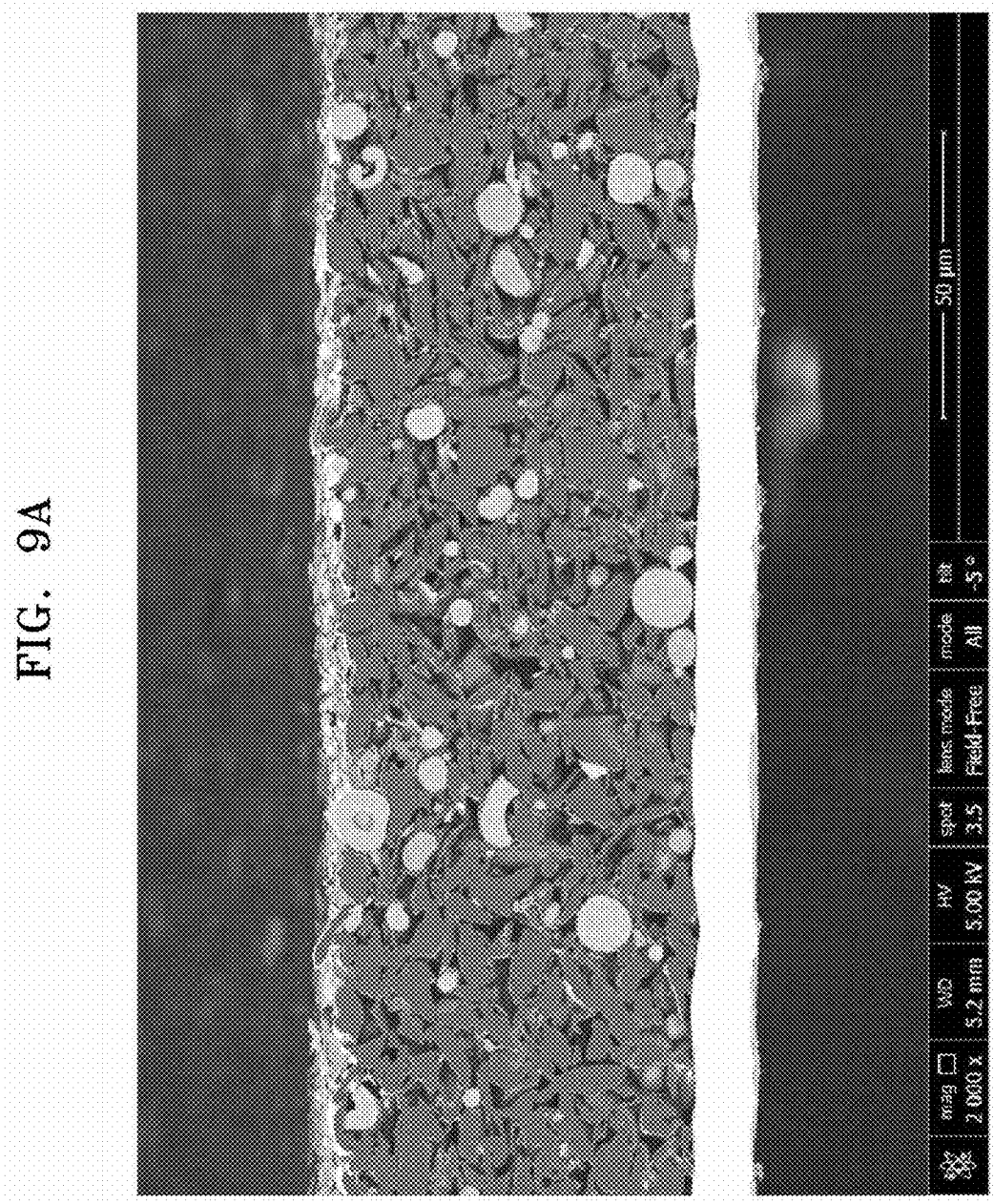
FIGS. 9A and 9B are SEM images of the full cell prepared according to Comparative Example 2 before charging and discharging cycles and after 200 cycles, respectively.
Figure 9B:
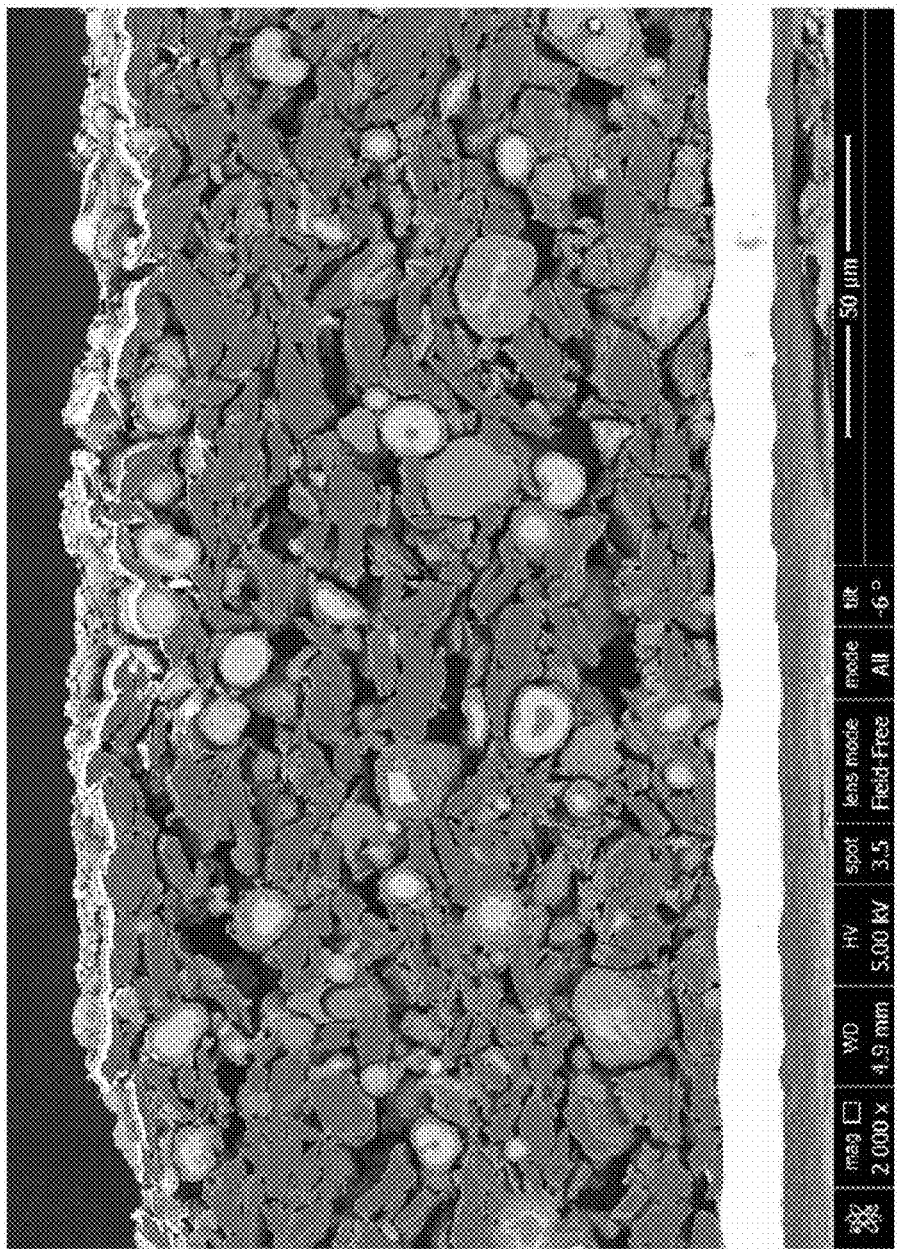

FIGS. 8A and 8B show cross-sections of the negative electrode of the coin full cell prepared according to Comparative Example 1 before the charging and discharging cycles and after repeating 200 cycles of charging and discharging, respectively. FIGS. 9A and 9B show cross-sections of the negative electrode of the coin full cell prepared according to Comparative Example 2 before the charging and discharging cycles and after repeating 200 cycles of charging and discharging, respectively.

It was confirmed that the negative electrode according to Example 1 had less voids and less expanded after repeating 200 cycles of charging and discharging than the negative electrodes according to Comparative Examples 1 and 2. Such results indicate that, by adding the graphene-silica composite to the negative electrode according to Example 1, adhesion among structural components of the negative electrode increases to form a surface-to-surface conductive path and a conductive network is formed, thereby improving adhesive strength. As a result, voids are reduced in the negative electrode and electrical short-circuiting is prevented during cycles. As described above, the negative electrode according to Example 1 including the negative active material structurally stable after charging and discharging may be used to prepare a battery having low expansion and excellent durability.

Evaluation Example 6

Electrolyte Impregnating Time

Time taken for impregnating each of the coin half cells prepared according to Example 4 and Comparative Example 3 with the electrolyte was measured. The electrolyte was prepared by dissolving 1.0 M LiPF6 in a mixed solvent of ethylenecarbonate (EC), diethyl carbonate (DEC), and fluoroethylene carbonate (FEC) (mixed in a volumetric ratio of 5:70:25).

The results are shown in Table 5 below.

TABLE 5

| Example | Electrolyte impregnating time |
| --- | --- |
| Example 4 | 50 seconds |
| Comparative Example 3 | 1 minute 15 seconds |

As shown in Table 5, the coin half cell according to Example 4 exhibited less electrolyte impregnating time than that of the coin half cell according to Comparative Example 3. Thus, it was confirmed that the coin half cell according to Example 4 had better electrolyte impregnating properties and wetting property than that of Comparative Example 3.

Initial efficiency, charging and discharging rate characteristics, and lifespan characteristics of lithium batteries may be improved by using the electrode composite conducting agent according to an embodiment.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. An electrode composite conducting agent for a lithium battery, the electrode composite conducting agent comprising; a carbonaceous conductive material; and a graphene-silica composite, wherein the graphene-silica composite comprises a matrix comprising graphene, and a silicon suboxide of the formula $SiO_x$ wherein $0<x<2$, or a combination of silicon dioxide and the silicon suboxide of the formula $SiO_x$ wherein $0<x<2$, wherein an amount of the graphene-silica composite is 20 parts by weight or less, based on 100 parts by weight of a total weight of the composite conducting agent.

2. The electrode composite conducting agent for a lithium battery of claim 1, wherein the graphene-silica composite has a specific surface area of about 50 square meters per gram to about 800 square meters per gram.

3. The electrode composite conducting agent for a lithium battery of claim 1, wherein the amount of the graphene-silica composite is from about 0.5 parts by weight to 20 parts by weight, based on 100 parts by weight of the total weight of the composite conducting agent.

4. The electrode composite conducting agent for a lithium battery of claim 1, wherein the graphene-silica composite is in a form of particles comprising the silicon suboxide and the graphene, particles in which the silicon suboxide is completely surrounded by the graphene, or a combination thereof, and wherein the particles comprising the silicon suboxide and the graphene, the particles in which the silicon suboxide is completely surrounded by the graphene, or the combination thereof are interconnected to form the matrix comprising graphene.

5. The electrode composite conducting agent for a lithium battery of claim 1, wherein the silicon dioxide is partially or completely surrounded by the silicon suboxide.

6. The electrode composite conducting agent for a lithium battery of claim 1, wherein the graphene-silica composite has a size of about 50 nanometers to about 200 nanometers.

7. The electrode composite conducting agent for a lithium battery of claim 1, wherein the carbonaceous conductive material comprises graphene, graphite, carbon black, a carbon nanotube, a vapor grown carbon fiber, or a combination thereof, and
    the carbonaceous conductive material has a specific surface area of about 10 square meters per gram to about 1000 square meters per gram.

8. The electrode composite conducting agent for a lithium battery of claim 1, wherein the carbonaceous conductive material has a flake shape, a plate shape, a rod shape, or a combination thereof, and
    the graphene-silica composite has a merged-sphere structure, a faceted-sphere structure, or a crumpled-sphere structure.

9. An electrode for a lithium battery, the electrode comprising:
    an electrode active material and a conductive agent,
    wherein the conductive agent comprises the composite conducting agent of claim 1.

10. The electrode of claim 9, wherein an amount of the composite conducting agent is from about 0.1 parts by weight to about 10 parts by weight, based on 100 parts by weight of a total weight of the electrode.

11. The electrode of claim 9, wherein the electrode active material comprises a carbonaceous material, a silicon-containing material, a silicon oxide, a silicon-containing alloy, a silicon-carbonaceous material composite, tin, a tin-containing alloy, a tin-carbon composite, a metal oxide, a porous silicon composite, or a combination thereof.

12. The electrode of claim 11, wherein the porous silicon composite comprises
a porous core comprising a porous silicon secondary particle, and a shell formed on at least one surface of the porous core and comprising a first graphene,
wherein the porous silicon secondary particle comprises an aggregate of a plurality of silicon composite primary particles, and
wherein a silicon composite primary particle of the plurality of silicon composite primary particles comprises silicon,
a silicon suboxide of the formula $SiO_x$ wherein $0<x<2$ on the silicon, and
a second graphene on at least one surface of the silicon suboxide.

13. The electrode of claim 9, wherein the electrode active material comprises a porous silicon composite and a carbonaceous material.

14. The electrode of claim 13, wherein the carbonaceous material comprises graphene, graphite, fullerene, graphitic carbon, carbon fiber, carbon nanotube, pitch carbon, or a combination thereof.

15. A lithium battery comprising the electrode of claim 9.

16. A method of preparing an electrode for a lithium battery, the method comprising: dry mixing an electrode active material, a carbonaceous conductive material, and a graphene-silica composite to obtain a mixture; adding a binder and a solvent to the dry-mixed mixture; and
mixing the binder and the mixture to obtain an electrode active material composition, wherein the graphene-silica composite comprises a matrix comprising graphene, and a silicon suboxide of the formula $SiO_x$ wherein $0<x<2$, or a combination of silicon dioxide and a silicon suboxide of the formula $SiO_x$ wherein $0<x<2$, and an amount of the graphene-silica composite is 20 parts by weight or less, based on 100 parts by weight of a total weight of the carbonaceous conductive material and the graphene-silica composite constituting a composite conducting agent.

17. The method of claim 16, wherein the graphene-silica composite has a specific surface area of about 50 square meters per gram to about 800 square meters per gram, and
the carbonaceous conductive material has a specific surface area of about 10 square meters per gram to about 1,000 square meters per gram.

18. The method of claim 16, wherein the graphene-silica composite is in a form of a plurality of particles comprising the silicon suboxide and the graphene, a plurality of particles in which the silicon suboxide is completely surrounded by graphene, or a combination thereof, and wherein the particles comprising the silicon suboxide and the graphene, the particles in which the silicon suboxide is completely surrounded by the graphene, or the combination thereof are interconnected with each other in the matrix comprising graphene.

19. The method of claim 16, wherein the electrode active material comprises a carbonaceous material, a silicon-containing material, a silicon oxide, a silicon-containing alloy, a silicon-carbonaceous material composite, tin, a tin-containing alloy, a tin-carbon composite, a metal oxide, a porous silicon composite, or a combination thereof,
the carbonaceous material comprises graphene, graphite, carbon black, carbon nanotube, vapor grown carbon fiber, metal-clad carbon fiber, or a combination thereof,
the porous silicon composite comprises a porous core including a porous silicon secondary particle and a shell on at least one surface of the porous core and comprising a first graphene,
wherein the porous silicon secondary particle comprises an aggregate of a plurality of silicon composite primary particles, and
wherein a silicon composite primary particle of the plurality of silicon composite primary particles comprise silicon, a silicon suboxide on the silicon, and a second graphene on at least one surface of the silicon suboxide.

20. The method of claim 16, wherein the carbonaceous conductive material has a flake shape, a plate shape, a rod shape, or a combination thereof, and
the graphene-silica composite has a merged-sphere structure, a faceted-sphere structure, or a crumpled-sphere structure.

* * * * *